(12) United States Patent
Arioka et al.

(10) Patent No.: US 7,082,088 B2
(45) Date of Patent: Jul. 25, 2006

(54) OPTICAL RECORDING MEDIUM AND OPTICAL RECORDING METHOD BY IRRADIATION

(75) Inventors: Hiroyuki Arioka, Tokyo (JP); Syuji Tsukamoto, Tokyo (JP); Takashi Horai, Tokyo (JP); Shirou Ootsuki, Tokyo (JP)

(73) Assignee: TDK Corporation, Tokyo (JP)

( * ) Notice: Subject to any disclaimer, the term of this patent is extended or adjusted under 35 U.S.C. 154(b) by 723 days.

(21) Appl. No.: 10/107,368

(22) Filed: Mar. 28, 2002

(65) Prior Publication Data

US 2002/0191512 A1    Dec. 19, 2002

Related U.S. Application Data

(60) Provisional application No. 60/279,748, filed on Mar. 30, 2001, provisional application No. 60/279,757, filed on Mar. 30, 2001, provisional application No. 60/279,751, filed on Mar. 30, 2001, provisional application No. 60/279,750, filed on Mar. 30, 2001, provisional application No. 60/279,752, filed on Mar. 30, 2001.

(51) Int. Cl.
*G11B 15/52* (2006.01)
(52) U.S. Cl. .................. 369/47.51; 369/275.3
(58) Field of Classification Search .......... None
See application file for complete search history.

(56) References Cited

U.S. PATENT DOCUMENTS

2001/0036143 A1    11/2001    Ohono et al.

FOREIGN PATENT DOCUMENTS

| JP | 61-211835 | 9/1986 |
|---|---|---|
| JP | 62-164590 | 7/1987 |
| JP | 63-302426 | 12/1988 |
| JP | 1-154328 | 6/1989 |
| JP | 1-182846 | 7/1989 |
| JP | 2-64932 | 3/1990 |
| JP | 2-278535 | 11/1990 |
| JP | 2-504196 | 11/1990 |
| JP | 3-228227 | 10/1991 |
| JP | 4-044642 | 2/1992 |
| JP | 05-73929 | 3/1993 |
| JP | 5-205276 | 8/1993 |
| JP | 7-65397 | 3/1995 |
| JP | 8-077599 | 3/1996 |
| JP | 8-124167 | 5/1996 |
| JP | 2634827 | 4/1997 |
| JP | 10-027396 | 1/1998 |
| JP | 11-25456 | 1/1999 |

*Primary Examiner*—Paul W. Huber
(74) *Attorney, Agent, or Firm*—Oliff & Berridge, PLC

(57) ABSTRACT

On a recording layer (12) of a disc-shaped optical recording medium (10), a plurality of virtual recording cells (40) are assumed contiguously in a spiral or concentric fashion in a groove (16). The irradiation time of the laser beam is modulated in five stages or more for each of the virtual recording cells (40) in response to information to be recorded, thereby forming recording marks (48A to 48G) of different sizes in five stages or more. The optical reflectivity of the virtual recording cell (40) is modulated in multi-stages to thereby vary the reflection level of a reading laser beam for reading operations in five stages or more. The length of the virtual recording cells (40) in the rotational direction of the disc is set to be equal to that of an arc having the same center angle with respect to the center of the disc.

32 Claims, 15 Drawing Sheets

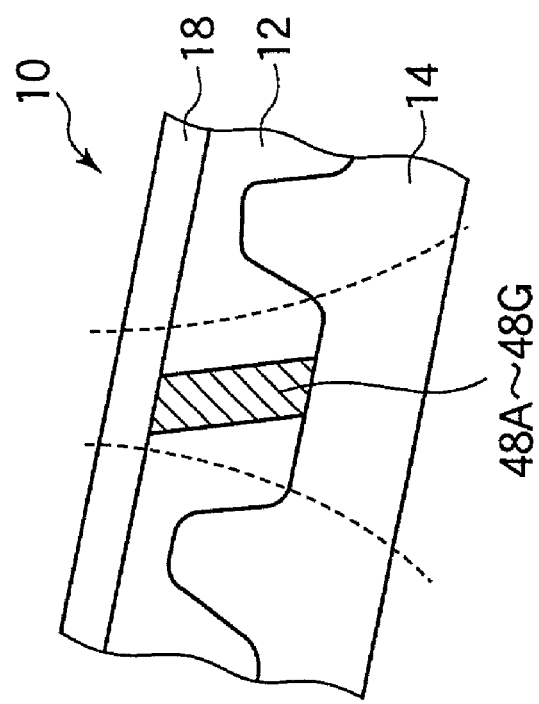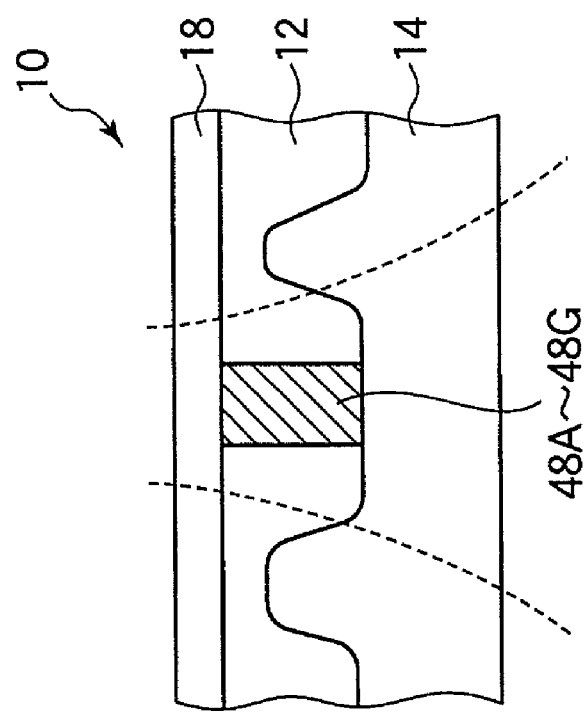

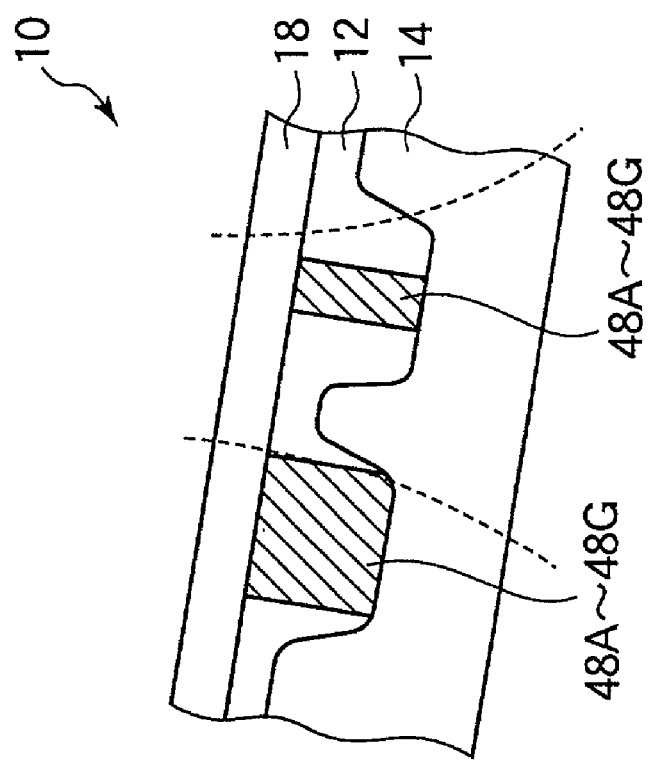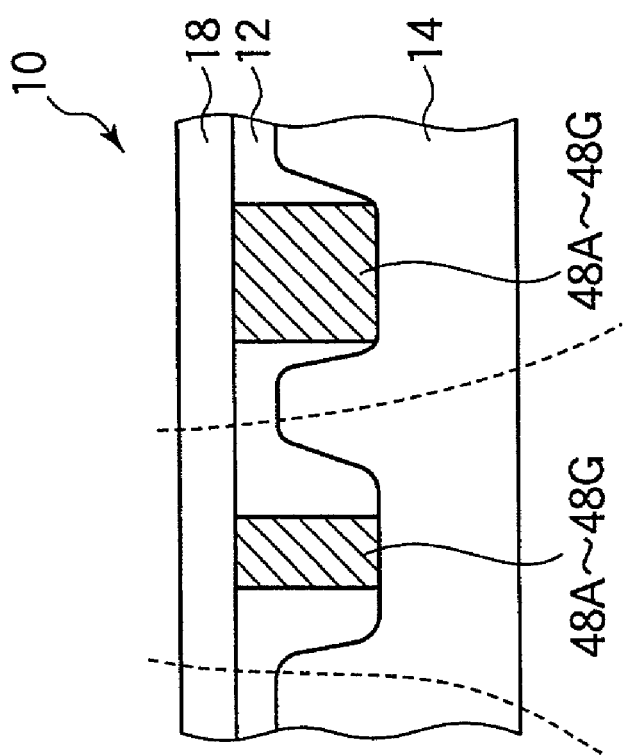

OPTICAL RECORDING MEDIUM AND OPTICAL RECORDING METHOD BY IRRADIATION

This application benifit of U.S. Provisional Application Ser. No. 60/279,748, filed Mar. 30, 2001, which claims benifit of U.S. Provisional Application Ser. No. 60/279,757, filed Mar. 30,2001, which claims benifit of U.S. Provisional Application Ser. No. 60/279,751, filed Mar. 30, 2001, which claims benifit of U.S. Provisional Application Ser. No. 60/279,750, filed Mar. 30, 2001, which claims benifit of U.S. Provisional Application Ser. No. 60/279,752, filed Mar. 30, 2001.

DETAILED DESCRIPTION OF THE INVENTION

1. Field of the Invention

The present invention relates to an optical recording medium and an optical recording method for irradiating the optical recording medium with a laser beam by switching in multi-stages at least one of the irradiation time and the irradiation power of the laser beam in response to the data to be recorded in order to form recording marks of multiple types and thereby record information in multi-levels on the recording layer.

2. Description of the Prior Art

There have been methods for changing the length of read signals (the length of the modulated portion of reflected signals) in multi-stages to thereby record data on a conventional optical recording medium. In contrast, a number of studies have been made on methods for switching the depth of read signals (the degree of modulation of reflected signals) to thereby record multiple pieces of data in multi-stages on each of the signals having the same length.

This optical recording method, in comparison with a method for recording binary data merely according to the presence or absence of pits, makes it possible to record multiple pieces of data in the depth direction. This allows more signals to be assigned to a given length and thus the linear recording density to be improved. In general, as a method for switching the depth of a read signal in multi-stages, the power of a laser beam is switched in multi-stages to thereby form some recording marks of different types. As a recording medium for use with this method, currently suggested is one that uses holograph or has a multi-layered recording layer.

Incidentally, it is herein called the multi-level recording to record data in multi-stages, for example, according to variations in depth of reflectivity.

To improve the recording density in such multi-level recording, it is necessary to reduce the length of recording marks.

However, it is difficult to perform multi-level recording with a recording mark smaller than the diameter of a converged laser beam that is used for recording and reading operations.

For example, in Japanese Patent Laid-Open Publication No.Hei 10-134353, disclosed is a method for adjusting the optical quantity of a laser beam to perform multi-level recording. In this publication, for a recording medium made of a dye film or phase changing film, read signals are formed according to the difference in reflectivity between the record portion and non-record portion. Therefore, according to the method disclosed in Japanese Patent Laid-Open Publication No.Hei 10-134353, a non-record stage and a record stage are related to each other in terms of the presence or absence of record, therefore making the method unsuitable for multi-stage recording. More specifically, there exists no intermediate state between the record and non-record stages in the recording medium made of a dye film or phase changing film.

However, it has been made possible to perform multi-level recording in multi-stages on a recording medium made of a dye film or phase changing film by adjusting the optical quantity of a laser beam. This is only because the power of the laser beam was varied to principally change the width of recording mark.

In general, a converged laser beam forms a Gaussian distribution, however, only a portion of the beam above a threshold is available for recording a dye film or phase changing film. Changing the power of a laser beam caused the recordable spot size of the converged beam to vary, thereby changing the width of recording marks.

However, suppose that recording marks are reduced in length with respect to the diameter of the converged beam to increase the recording density. In this case, it would be difficult to perform multi-level recording in multi-stages, particularly in five stages or more, in accordance with the method for modulating the power of the laser beam and thereby changing the width of the mark. In other words, changing the power of recording makes it difficult to vary the level of reflection in five stages or more for reading operations.

In general, the diameter of a converged beam is expressed by $K\lambda/NA$ (where K is a constant, $\lambda$ is the wavelength of the laser beam, and NA is the numerical aperture of a lens). In general, $\lambda=780$ nm and NA=0.45 are employed in pickups for use with CDs, with the converged beam being about 1.6 $\mu$m in diameter. In this case, with the recording mark being around 1.6 $\mu$m in length, the aforementioned problem of signal degradation became apparent, causing the conventional method for varying the power of a laser beam to perform multi-level recording in five stages or more with difficulty.

For example, as disclosed in Japanese Patent Laid-Open Publication No.Hei 1-182846, also available is such an optical recording medium which digitally varies its optical absorbency of a reactant in the recording layer when the amount of light incident upon the recording layer is digitally given.

However, this optical recording medium presumably provides extremely small absolute variations in optical absorbency in response to the amount (the number of times) of laser irradiation, having been not yet in the actual use.

Furthermore, as disclosed in Japanese Patent Laid-Open Publication No.Sho 61-211835, also available is such an optical recording medium which varies the intensity of light for irradiating a photochromic material therewith or the number of times of its irradiation in order to record the material in given different stages of color density.

However, this optical recording method raises a problem that the color density cannot be read in five stages or more upon irradiating the material with a laser beam for reading operations.

On the other hand, to improve record densities, available is such means called the land-groove recording for forming recording marks both on lands and a groove sandwiched between the lands.

This land-groove recording appears to double recording areas. However, binary recording causes a signal being recorded in a groove to grow and thereby overflow onto a land, resulting in an adverse effect such as cross talk. Thus, it is difficult in practice to substantially improve the recording density.

On the other hand, these optical methods for multi-level recording had a problem of providing signals that were degraded in quality at the time of reading operations as the power of a laser beam for recording operating increased, that is, as a reflected signal to be formed was increased in depth. The reason for this has not yet been made clear until now, however, the inventor predicts that this is conceivably caused by an increase in area of a recording mark (recording mark area) resulting from an increase in the laser power.

For example, suppose that a conventional method was used to shorten recording marks and thereby record an amount of information at a high density on a recording medium, in which the power of a laser beam was switched in multi-stages to perform multi-level recording. In this case, the quality of signals was significantly degraded, resulting in making no use of the merit of the multi-level recording. That is, to employ the multi-level recording, the recording marks had to be spaced widely apart from each other so that data could be positively detected to some extent even when the quality of signals was degraded. For this reason, the conventional method had a problem that recording marks were provided at a high density with difficulty, thus leading to mutually contradictory circumstances.

The concept of a conventional optical recording method for performing multi-level recording by switching the power of a laser beam step by step is based on the premise that the length of a recording mark is greater than the diameter of a converged beam (beam waist) available at the time of recording operations. That is, the concept aims to realize multi-level recording by modulating the optical reflectivity of the recording mark itself in multi-stages and then directly reading the reflectively. According to a close study made by the inventor, this was presumably in part because of the fact that on the precondition that the length of the recording mark was greater than the diameter of the converged beam (beam waist) available at the time of recording operations, the optical reflectivity of the recording mark itself was modulated in multi-stages and then directly read, thereby realizing multi-level recording.

The problems mentioned above are conceivably resulted from every factor, intertwined in a complicated manner, such as the power setting of the laser beam or the characteristics of the recording medium. However, so long as known to the inventor, the causes of the problem have not yet been made clear until now. Thus, the real picture is that the multi-level recording at a high density as well as its recording method have not yet been accomplished.

The inventor has discovered a method that enables multi-level recording in five stages or more by varying at least one of the irradiation time and irradiation power of the laser even under the condition that the length of the recording mark is shorter than the diameter of the converged beam. This method provides an advantage of maintaining the same recording density on the inner and outer circumferences of a disc (a recording medium) since it is rotated at a constant linear velocity. However, the method requires the reading and recording apparatus to perform a high-level control of rotation since different radial positions experience always different rotational velocities. For this reason, the method raises a problem associated with the improvement of data transfer rates and access velocities.

SUMMARY OF THE INVENTION

In consideration of the foregoing, it is therefore an object of the present invention to provide an optical recording medium having the shape of a disc, like a CD-R (CD recordable) or a CD-RW (CD rewritable), which is generally in actual wide use, and an optical recording method which enables multi-level recording in multi-stages and providing good signal quality. Furthermore, it is another object to provide a multi-level optical recording medium which can be used not only for recording video images but also as a peripheral storage device of a computer, and its optical recording method.

The inventor et al have made intensive studies on the multi-level recording and consequently already invented a technique, currently not yet publicly known, for performing the multi-level recording using the principle of virtual recording cells. For example, this technique is an optical recording medium in which on an optical transparent substrate having predetermined a groove, a recording layer is formed to cover the groove and irradiated with a laser beam to form recording marks at least on the recording layer to thereby record information thereon. On the recording layer, contiguously defined along a feed direction of the laser irradiation for recording and reading operations are virtual recording cells which have a given unit length in the feed direction along the groove and a given unit width in the direction perpendicular thereto. At least either the irradiation time or irradiation power is set in multi-stages to irradiate the virtual recording cell with the laser beam, thereby allowing for forming recording marks of different sizes in multi-stages on the virtual recording cell. The optical reflectivity is modulated in accordance with the area ratio of the recording mark to the virtual recording cell-, thereby allowing for recording information in multi-levels.

That is, the inventor has made intensive studies on an optical recording medium and found a method for recording it in multi-stages, confirming that the method made it possible to perform multi-level recording (the land-groove recording) at high densities in five stages or more on the disc-shaped optical recording medium, while rotating the record cells at a constant angular velocity.

In the course of further studies, it was also found that the virtual recording cell set by the aforementioned technique was closely related to recording and reading operations and, among other things, the length of the virtual recording cell was insufficient if only selected at random. Furthermore, it was also found that the length was closely related to the number of recording stages.

In some cases of performing multi-level recording, the state of the recording layer varies because of irregularities in thickness of a recording layer made of dye and irregularities in composition of an inorganic material, and thus the same recording level cannot be achieved even when recording is performed with a laser beam of the same recording intensity. It is therefore another object of the present invention to provide an optical recording method and an optical recording medium that prevents these irregularities to achieve multi-level recording in more multi-stages.

The inventor has made intensive studies on optical recording media, and found a multi-stage recording method in which virtual recording cells of a constant size were assumed on the recording layer, where recording marks of different sizes were formed to thereby modulate the reflectivity of the entire virtual recording cells in multi-stages. The inventor confirmed that the method made it possible to perform multi-level recording at high densities in five stages or more on an optical recording medium.

Furthermore, the inventor has confirmed that multi-level recording can be performed in more multi-stages, even with irregularities present in the recording layer, by controlling, within a predetermined value, the width of variation in the amount of a laser beam having the same recording intensity and reflected from the virtual recording cell of a recording mark.

In more detail, according to the analysis performed by the inventor, it was found that the reflectivity of respective signals interferes with each other to have adverse effect on recording and reading operations unless the reflectivity levels of the signals are spaced from each other by a certain amount in order to properly perform the multi-level recording on the virtual recording cell with a variation in reflectivity in five stages or more.

In this context, various studies were made to properly perform recording and reading operations that were not affected by the interference between signals. As a result, it was found necessary to control the width of variation in the size of recording marks, caused by variations such as irregularities in thickness of the recording layer and by a laser beam having the same recording intensity, especially in order to perform a multi-level recording in five stages or more.

In this context, a running OPC (Optimum Power Control) is suggested which compensates the recording intensity of a laser beam to an appropriate value by comparing the amount of light reflected from the virtual recording cell with the amount of reference light reflection during recording information by a multi-level recording method.

That is, the present invention described below allows the aforementioned objected to be achieved.

(1) An disc-shaped optical recording medium for recording information thereon by being irradiated with a laser beam to form recording marks on a recording layer while being rotated about the center of the disc. The optical recording medium is capable of reading the recorded information by irradiating the recording mark with a reading laser beam. The optical recording medium is characterized in that a plurality of virtual recording cells are set on the recording layer continuously in a concentric fashion or in a spiral fashion about the center of the disc, the virtual recording cell being defined by a unit length in the rotational direction of the disc and a unit width perpendicular thereto. At least part of the unit length of the virtual recording cell is set so as to have an arc length of the same center angle with respect to the center of the disc irrespective of positions in the radial direction of the disc. The recording layer of the virtual recording cell allows for forming thereon recording marks of different sizes in response to a laser beam with at least one of irradiation time and irradiation power of the laser beam being modulated in five stages or more. Information can be thereby recorded in multi-levels in five stages or more by modulating an optical reflectivity in accordance with at least an area ratio of the recording mark to the virtual recording cell between the area ratio and optical transmittance.

(2) The optical recording medium according to (1), characterized in that the unit length of the virtual recording cell is increased toward the outer circumference of the disc, and thereby stages of modulation on at least one of the irradiation time and the irradiation power of the laser beam to be directed at the virtual recording cell is increased in number toward the outer circumference of the disc.

(3) The optical recording medium according to (1), characterized in that within the range of the arc length being twice or more an arc length on the innermost side in the radial direction of the disc, two virtual recording cells are set within the range of the arc length.

(4) The optical recording medium according to (2) or (3), characterized in that along the recording layer, a groove for guiding a laser beam is sandwiched by lands disposed in parallel thereto, and provided in a concentric fashion with a constant pitch or in a spiral fashion in the radial direction of the disc. The virtual recording cell is set in the groove with the unit width being generally made equal to the width of the groove. At least one of information on the number of stages of modulation and information on divided virtual recording cell is prerecorded at least on part of a signal prerecording portion including a grove wobble, land pre-pit, and sample servo.

(5) The optical recording medium according to any one of (1), (2), (3), and (4), characterized in that information on recording rotation maintained at a constant angular velocity on part of virtual recording cells by keeping an angular velocity constant on each virtual recording cell or by partially changing the number of rotations is prerecorded at least on part of a signal prerecording portion including a grove wobble, land pre-pit, and sample servo.

(6) The optical recording medium according to any one of (1) to (5), characterized in that the unit length of the virtual recording cell on the innermost side in the radial direction of the disc is less than or equal to the diameter of a beam waist of the recording laser beam.

(7) An optical recording method for recording information on a disc-shaped optical recording medium having a recording layer, while the optical recording medium is being rotated, by irradiating the recording layer with a laser beam to thereby form recording marks on the recording layer. The method is characterized in that a plurality of virtual recording cells are assumed contiguously on the recording layer in a concentric fashion or in a spiral fashion about the center of the disc. At least part of a unit length of the virtual recording cell is set so as to have an arc length of the same center angle with respect to the center of the disc irrespective of positions in the radial direction of the disc. With rotation upon recording at least part of the virtual recording cell being kept at a constant angular velocity, at least one of the irradiation time and irradiation power of the laser beam is modulated for each virtual recording cell in five stages or more to change the size of a recording mark formed in the virtual recording cell. The optical reflectivity of the entire virtual recording cell is modulated in accordance with at least an area ratio of the recording mark to the virtual recording cell between the area ratio and optical transmittance of the recording mark, thereby recording information in multi-levels in five stages or more.

(8) The optical recording method according to (7), characterized in that stages of modulation on at least one of the irradiation time and the irradiation power of the laser beam to be directed at the virtual recording cell is increased in number toward the outer circumference of the disc.

(9) The optical recording method according to (7) or (8), characterized in that the irradiation power of the laser beam is varied in response to the position of irradiation in the radial direction of the disc.

(10) The optical recording method according to (9), characterized in that the irradiation power is sequentially increased from an inner position of irradiation in the radial direction of the disc toward an outer position of irradiation.

(11) The optical recording method according to any one of (7) to (10), characterized in that a starting position of recording within the virtual recording cell is assigned as appropriate to any one of a leading end, the center, and a trailing end in response to the position in radial direction of the disc.

(12) The optical recording method according to any one of (7) to (10), characterized in that the virtual recording cell is contiguously assumed in a concentric fashion about the center of the disc, and starting positions of virtual recording cells adjacent to each other in the radial direction of the disc are set to be shifted from each other in the rotational direction of the disc.

(13) The optical recording medium according to any one of (9) to (12), wherein the unit length of the virtual recording cell is less than or equal to the diameter of the beam waist of the reading laser beam.

(14) The optical recording medium according to any one of (10) to (13), wherein at least one of information that recording can be performed on both the groove and lands, and information that the optical recording medium is a multi-level recording medium is prerecorded at least on part a signal prerecording portion including a groove wobble, land pre-pit, and sample servo.

(15) A disc-shaped optical recording medium for recording information thereon by being irradiated with a laser beam focused by an objective lens to form recording marks on a recording layer while being rotated about the center of the disc, the optical recording medium being capable of reading the recorded information by irradiating the recording mark with a reading laser beam, wherein a plurality of virtual recording cells are set on the recording layer continuously in a concentric fashion or in a spiral fashion about the center of the disc, the virtual recording cell being defined by a unit length in a rotational direction of the disc and a unit width perpendicular thereto; the unit length H of at least part of the virtual recording cell is set so as to have an arc length of the same center angle with respect to the center of the disc irrespective of positions in a radial direction of the disc and the unit length H given by $0.10\times(\lambda/NA)<H<1.00\times(\lambda/NA)$ in the direction of movement, where NA is the numerical aperture of the objective lens and $\lambda$ is the wavelength of the laser beam; the recording layer of the virtual recording cell allows for forming thereon recording marks of different sizes in response to the laser beam with at least one of irradiation time and irradiation power of the laser beam being modulated in five stages or more; and thereby information can be recorded in multi-levels in five stages or more by modulating an optical reflectivity in accordance with at least an area ratio of the recording mark to the virtual recording cell between the area ratio and optical transmittance.

(16) The disc-shaped optical recording medium according to (15), wherein the optical recording medium having a groove, for guiding the laser beam, sandwiched by lands disposed in parallel thereto and in a concentric fashion or in a spiral fashion at a constant pitch in the radial direction of the disc, the optical recording medium, the recording layer is formed on the groove and the lands and the a plurality of virtual recording cells are set on the recording layer disposed on the groove and lands.

(17) The optical recording medium according to (16), wherein the unit length of the virtual recording cell is set to be generally equal to the length of a recording mark formed by being irradiated with a laser beam in the maximum irradiation time.

(18) The optical recording medium according to (15), wherein on a recording mark formation region, the optical recording medium has information referenced to correct the recording strength of the laser beam to be used for recording, upon recording by switching the recording strength of the laser beam in five stages or more.

(19) A disc-shaped optical recording medium capable of recording information thereon by irradiating a recording layer with a laser beam focused by an objective lens to form recording marks on the recording layer, while the optical recording medium is being rotated, the optical recording medium having a groove, for guiding the laser beam, sandwiched by lands disposed in parallel thereto and in a concentric fashion or in a spiral fashion at a constant pitch in the radial direction of the disc, the optical recording medium wherein the recording layer is formed on the groove and the lands; a plurality of virtual recording cells are set contiguously in a rotational direction of the disc, the virtual recording cell being defined by a unit length H in the rotational direction of the disc and a unit width perpendicular thereto on the recording layer disposed on the groove and lands; the unit length H is given by $0.10\times(\lambda/NA)<H<1.00\times(\lambda/NA)$ in a direction of movement, where NA is the numerical aperture of the objective lens and $\lambda$ is the wavelength of the laser beam; the virtual recording cell capable to be irradiated with the laser beam with at least one of its irradiation time or irradiation power being controlled in multiple stages to thereby form recording marks of different states in multiple stages on the virtual recording cell; and information can be thereby recorded in multi-levels by making it possible to modulate an optical reflectivity of the entire virtual recording cell in multiple stages in accordance with the occupation ratio of the recording mark to the virtual recording cell.

(20) The optical recording medium according to (19), wherein on a recording mark formation region, the optical recording medium has information referenced to correct the recording strength of the laser beam to be used for recording, upon recording by switching the recording strength of the laser beam in five stages or more.

(21) A disc-shaped optical recording medium capable of recording information thereon by irradiating a recording layer with a laser beam to form recording marks on the recording layer and capable of reading the recorded information by irradiating the recording marks with a reading laser beam, while the optical recording medium is being rotated, the optical recording medium having a groove, for guiding the laser beam, sandwiched by lands disposed in parallel thereto and in a concentric fashion or in a spiral fashion at a constant pitch in the radial direction of the disc, the optical recording medium wherein the recording layer is formed on the groove and the lands; a plurality of virtual recording cells are set contiguously in a rotational direction of the disc, the virtual recording cell being defined by a unit length in the rotational direction of the disc and a unit width perpendicular thereto on the recording layer disposed on the groove and lands; the recording layer of the virtual recording cell allows for forming thereon recording marks of different sizes in response to a laser beam with at least one of irradiation time and irradiation power of the laser beam being modulated in five stages or more; thereby information can be recorded in multi-levels in five stages or more by modulating an optical reflectivity in accordance with at least an area ratio of the recording mark to the virtual recording cell among the area ratio and optical transmittance; and on a recording mark formation region, the optical recording medium has information referenced to correct the recording strength of the laser beam to be used for recording, upon recording by switching the recording strength of the laser beam in five stages or more.

(22) An optical recording method for recording information on a disc-shaped optical recording medium having a recording layer, while the optical recording medium is being rotated, by irradiating the recording layer with a laser beam to thereby form recording marks on the recording layer, wherein a plurality of virtual recording cells are assumed contiguously on the recording layer in a concentric fashion or in a spiral fashion about the center of the disc; a unit length of at least part of the virtual recording cell is set so as to have an arc length of the same center angle with respect to the center of the disc irrespective of positions in a radial direction of the disc; with rotation upon recording at least part of the virtual recording cell being kept at a constant angular velocity, at least one of irradiation time and irradiation power of the laser beam is modulated for each virtual recording cell in five stages or more to change the size of a recording mark formed in the virtual recording cell; and an optical reflectivity of the entire virtual recording cell is modulated in accordance with at least an area ratio of the recording mark to the virtual recording cell among the area ratio and optical transmittance of the recording mark, thereby recording information in multi-levels in five stages or more.

(23) The optical recording method according to (22), wherein stages of modulation on at least one of the irradiation time and the irradiation power of the laser beam to be directed at the virtual recording cell is increased in number toward the outer circumference of the disc.

(24) The optical recording method according to (22) or (23), wherein the irradiation power of the laser beam is varied in response to the position of irradiation in the radial direction of the disc.

(25) The optical recording method according to (24), wherein the irradiation power is sequentially increased from an inner position of irradiation in the radial direction of the disc toward an outer position of irradiation.

(26) The optical recording method according to any one of (22) to (25), wherein a starting position of recording within the virtual recording cell is assigned as appropriate to any one of a leading end, the center, and a trailing end in response to the position in the radial direction of the disc.

(27) The optical recording method according to any one of (22) td (25), wherein the virtual recording cell is contiguously assumed in a concentric fashion about the center of the disc, and starting positions of virtual recording cells adjacent to each other in the radial direction of the disc are set to be shifted from each other in the rotational direction of the disc.

(28) An optical recording method for recording information on an optical recording medium having a recording layer by irradiating the recording layer with a laser beam focused by an objective lens to thereby form recording marks on the recording layer, wherein virtual recording cells are contiguously defined in a direction of movement relative to the laser beam on the recording layer, the virtual recording cell having a unit length H given by $0.10\times(\lambda/NA)<H<1.00\times(\lambda/NA)$ in a direction of movement, where NA is the numerical aperture of the objective lens and $\lambda$ is the wavelength of the laser beam; the virtual recording cell is irradiated with the laser beam with at least one of its irradiation time or irradiation power being controlled in multiple stages to thereby form recording marks of different states in multiple stages on the virtual recording cell; and information can be thereby recorded in multi-levels by making it possible to modulate an optical reflectivity of the entire virtual recording cell in multiple stages in accordance with the occupation ratio of the recording mark to the virtual recording cell.

(29) The optical recording method according to (28), wherein the number of stages N in controlling at least one of the irradiation time or irradiation power in stages is set so that $40<H/N<100$(nm) to form recording marks of different states at least in N stages.

(30) An optical recording method for recording information on an optical recording medium having a recording layer by irradiating the recording layer with a laser beam focused by an irradiation optical system to thereby form recording marks on the recording layer by the laser beam, wherein a plurality of virtual recording cells are contiguously defined in a direction of movement relative to the laser beam on the recording layer, the virtual recording cell having a given unit length in the direction of movement and a given unit width perpendicular to the direction of movement; while at least the irradiation optical system is being angle-controlled so as to prevent variations in angle of incidence of the laser beam to the recording layer, the recording layer is irradiated with a laser beam with at least one of its irradiation time or irradiation power being controlled in five stages or more to thereby form five types of recording marks or more in different sizes on the virtual recording cell; and information is thereby recorded in multi-levels by making it possible to modulate the optical reflectivity of the entire virtual recording cell in five stages or more in accordance with an occupation ratio of the recording mark to the virtual recording cell.

(31) The optical recording method according to (30), wherein at least the irradiation optical system is angle-controlled such that the angle of incidence of the laser beam to the recording layer falls within a predetermined range.

(32) The optical recording method according to (30) or (31), wherein upon irradiating part of the recording layer to which the plurality of virtual recording cells are set with the laser beam, the irradiation optical system is at least angle-controlled.

(33) An optical recording method for recording information on a disc-shaped optical recording medium with a groove and lands having a recording layer formed thereon, while the optical recording medium is being rotated, by irradiating the recording layer with a laser beam to form recording marks on the recording layer, the optical recording medium having the groove, for guiding the laser beam, sandwiched by the lands disposed in parallel thereto and in a concentric fashion or in a spiral fashion at a constant pitch in a radial direction of the disc, the method wherein a plurality of virtual recording cells are assumed contiguously on the recording layer disposed on the groove and land in a rotational direction of the disc, the virtual recording cell being defined by a unit length in the rotational direction of the disc and a unit width perpendicular thereto; at least one of irradiation time and irradiation power of the laser beam is modulated for each virtual recording cell in five stages or more to change the size of a recording mark formed in the virtual recording cell; and an optical reflectivity of the entire virtual recording cell is modulated in accordance with at least an area ratio of the recording mark to the virtual recording cell among the area ratio and optical transmittance of the recording mark, thereby recording information in multi-levels in five stages or more.

(34) An optical recording method for recording information on an optical recording medium capable of forming recording marks thereon by irradiating a recording layer formed on an optical transparent substrate with a laser beam, wherein on a recording mark formation region of the optical recording medium, a plurality of virtual recording cells are contiguously defined in a direction of movement relative to the laser beam, the virtual recording cell having a predetermined unit length and a predetermined unit width perpendicular thereto; an amount of reflected light from a virtual recording cell, having a recording mark formed thereon and irradiated with a laser beam, is modulated in five stages or more in response to the size of the recording mark; and upon irradiating the virtual recording cell with a laser beam with a recording strength of the laser beam being switched in five stages or more, the recording strength being at least one of irradiation time and irradiation power of the laser beam, while at least the amount of reflected light in one stage obtained by the optical recording medium is being confirmed and a recording strength associated at least with the amount of reflected light in the stage is being corrected, multi-level recording is performed.

(35) The optical recording method according to claim 34, wherein the confirmed amount of reflected light is compared with prerecorded information on a recording strength of a laser beam upon recording.

(36) The optical recording method according to (34) or (35), wherein the prerecorded information on a recording strength of a laser beam upon recording is recorded on a wobble or a land pre-pit.

(37) The optical recording method according to (34), wherein at least the amount of reflected light in the stage is confirmed and the amounts of reflected light in stages before and after the sage are confirmed as well.

(38) The optical recording method according to (34), wherein the amount of reflected light is confirmed using a virtual recording cell of a predetermined portion of the recording medium.

(39) The optical recording method according to (34), wherein the recording strength of the laser beam upon recording is kept constant from the point of time at which the recording strength of the laser beam upon recording is corrected until an amount of reflected light to be confirmed is shifted by a predetermined amount.

(40) An optical recording method for recording information on an optical recording medium capable of forming recording marks thereon by irradiating a recording layer formed on an optical transparent substrate with a laser beam, wherein on a recording mark formation region of the optical recording medium, a plurality of virtual recording cells are contiguously defined in a direction of movement relative to the laser beam, the virtual recording cell having a predetermined unit length and a predetermined unit width perpendicular thereto; before the virtual recording cell is irradiated with a laser beam with a recording strength of the laser beam being switched in five stages or more, the recording strength being at least one of irradiation time and irradiation power of the laser beam, part of the virtual recording cell is irradiated with the laser beam at least at a recording strength of those in the stages to form recording marks; and thereby multi-level recording is performed while the recording strength of the laser beam is being corrected by comparing the amount of reflected light obtained from the virtual recording cell with the amount of reflected light on a recording mark of a predetermined reference virtual recording cell.

(41) The optical recording method according to (34) or (40), wherein the prerecorded information on a recording strength of a laser beam upon recording is recorded on a read-in area, a wobble, or a land pre-pit.

(42) The optical recording method according to (40), wherein at least the amount of reflected light in the stage is confirmed and the difference between this amount of reflected light and the amounts of reflected light in stages before and after the sage is confirmed as well, thereby correcting the recording strength of the laser beam.

(43) An optical recording method for recording information on a disc-shaped optical recording medium having a recording layer, while the optical recording medium is being rotated, by irradiating the recording layer with a laser beam focused by an object lens to thereby form recording marks on the recording layer, wherein a plurality of virtual recording cells are assumed contiguously on the recording layer in a concentric fashion or in a spiral fashion about the center of the disc; a unit length H of at least part of the virtual recording cell is set so as to have an arc length of the same center angle with respect to the center of the disc irrespective of positions in a radial direction of the disc; and the unit length H given by $0.10\times(\lambda/NA)<H<1.00\times(\lambda/NA)$ in a direction of movement, where NA is the numerical aperture of the objective lens and $\lambda$ is the wavelength of the laser beam with rotation upon recording at least part of the virtual recording cell being kept at a constant angular velocity, at least one of irradiation time and irradiation power of the laser beam is modulated for each virtual recording cell in five stages or more to change the size of a recording mark formed in the virtual recording cell; and an optical reflectivity of the entire virtual recording cell is modulated in accordance with at least an area ratio of the recording mark to the virtual recording cell among the area ratio and optical transmittance of the recording mark, thereby recording information in multi-levels in five stages or more.

(44) The optical recording method according to (43), wherein while at least the irradiation optical system including the objective lens is being angle-controlled so as to prevent variations in angle of incidence of the laser beam to the recording layer, the recording layer is irradiated with a laser beam with at least one of its irradiation time or irradiation power being controlled in five stages or more; and information is thereby recorded in multi-levels.

(45) The optical recording method according to (43) or (44), wherein the optical recording medium having grooves, for guiding lasers beam, sandwiched by lands disposed in parallel thereto and in a concentric fashion or in a spiral fashion at a constant pitch in a radial direction of the disc, the method wherein the plurality of virtual recording cells are assumed contiguously on the recording layer disposed on the grooves and lands in a rotational direction of the disc, and thereby recording information for each virtual recording cell in multi-levels in five stages or more.

(46) The optical recording method according to (43), (44) or (45), wherein upon irradiating the virtual recording cell with a laser beam with a recording strength of the laser beam being switched in five stages or more, the recording strength being at least one of irradiation time and irradiation power of the laser beam, while at least the amount of reflected light in one stage obtained by the optical recording medium is being confirmed and a recording strength associated at least with the amount of reflected light in the stage is being corrected, multi-level recording is performed.

(47) The optical recording method according to (43), (44) or (45), wherein before the virtual recording cell is irradiated with a laser beam with a recording strength of the laser beam being switched in five stages or more, the recording strength being at least one of irradiation time and irradiation power of the laser beam, part of the virtual recording cell is irradiated with the laser beam at least at a recording strength of those in the stages to form recording marks; and thereby multi-level recording is performed while the recording strength of the laser beam is being corrected by comparing the amount of reflected light obtained from the virtual recording cell with the amount of reflected light on a recording mark of a predetermined reference virtual recording cell.

(48) An optical recording method for recording information on an optical recording medium having a recording layer by irradiating the recording layer with a laser beam focused by an objective lens to thereby form recording marks on the recording layer, wherein virtual recording cells are contiguously defined in a direction of movement relative to the laser beam on the recording layer, the virtual recording cell having a unit length H given by $0.10 \times (\lambda/NA) < H < 1.00 \times (\lambda/NA)$ in a direction of movement, where NA is the numerical aperture of the objective lens and $\lambda$ is the wavelength of the laser beam; while at least the irradiation optical system including the object lens is being angle-controlled so as to prevent variations in angle of incidence of the laser beam to record layer, the virtual recording cell is irradiated with the laser beam with at least one of its irradiation time or irradiation power being controlled in multiple stages to thereby form recording marks of different states in multiple stages on the virtual recording cell; and information can be thereby recorded in multi-levels by making it possible to modulate an optical reflectivity of the entire virtual recording cell in multiple stages in accordance with the occupation ratio of the recording mark to the virtual recording cell.

(49) The optical recording method according to (48), wherein the disc-shaped optical recording medium is provided with a groove and lands having the recording layer formed thereon, the groove is for guiding the laser beam and sandwiched by the lands disposed in parallel thereto and in a concentric fashion or in a spiral fashion at a constant pitch in a radial direction of the disc, the method wherein while the optical recording medium is being rotated, irradiates the recording layer with a laser beam, and thereby recording information in multi-levels in five stages or more.

(50) An optical recording method according to (48) or (49), wherein upon irradiating the virtual recording cell with a laser beam with a recording strength of the laser beam being switched in five stages or more, the recording strength being at least one of irradiation time and irradiation power of the laser beam, while at least the amount of reflected light in one stage obtained by the optical recording medium is being confirmed and a recording strength associated at least with the amount of reflected light in the stage is being corrected, multi-level recording is performed.

(51) An optical recording method according to (48) or (49), wherein before the virtual recording cell is irradiated with a laser beam with a recording strength of the laser beam being switched in five stages or more, the recording strength being at least one of irradiation time and irradiation power of the laser beam, part of the virtual recording cell is irradiated with the laser beam at least at a recording strength of those in the stages to form recording marks; and thereby multi-level recording is performed while the recording strength of the laser beam is being corrected by comparing the amount of reflected light obtained from the virtual recording cell with the amount of reflected light on a recording mark of a predetermined reference virtual recording cell.

(52) An optical recording method for recording information on a disc-shaped optical recording medium with a groove and lands having a recording layer formed thereon, the optical recording medium having the groove, for guiding the laser beam, sandwiched by the lands disposed in parallel thereto and in a concentric fashion or in a spiral fashion at a constant pitch in a radial direction of the disc, by irradiating the recording layer on the groove and the land with a laser beam focused by an irradiation optical system to thereby form recording marks on the recording layer by the laser beam, wherein a plurality of virtual recording cells are contiguously defined in a direction of movement relative to the laser beam on the recording layer, the virtual recording cell having a given unit length in the direction of movement and a given unit width perpendicular to the direction of movement; while at least the irradiation optical system is-being angle-controlled so as to prevent variations in angle of incidence of the laser beam to the recording layer, the recording layer is irradiated with a laser beam with at least one of its irradiation time or irradiation power being controlled in five stages or more to thereby form five types of recording marks or more in different sizes on the virtual recording cell; and information is thereby recorded in multi-levels by making it possible to modulate the optical reflectivity of the entire virtual recording cell in five stages or more in accordance with an occupation ratio of the recording mark to the virtual recording cell.

(53) The optical recording method according to (52), wherein upon irradiating the virtual recording cell with a laser beam with a recording strength of the laser beam being switched in five stages or more, the recording strength being at least one of irradiation time and irradiation power of the laser beam, while at least the amount of reflected light in one stage obtained by the optical recording medium is being confirmed and a recording strength associated at least with the amount of reflected light in the stage is being corrected, multi-level recording is performed.

(54) The optical recording method according to (52), wherein before the virtual recording cell is irradiated with a laser beam with a recording strength of the laser beam being switched in five stages or more, the recording strength being at least one of irradiation time and irradiation power of the laser beam, part of the virtual recording cell is irradiated with the laser beam at least at a recording strength of those in the stages to form recording marks; and thereby multi-level recording is performed while the recording strength of the laser beam is being corrected by comparing the amount of reflected light obtained from the virtual recording cell with the amount of reflected light on a recording mark of a predetermined reference virtual recording cell.

(55) An optical recording method for recording information on a disc-shaped optical recording medium with a groove and lands having a recording layer formed thereon, while the optical recording medium is being rotated, by irradiating the recording layer with a laser beam to form recording marks on the recording layer, the optical recording medium having the groove, for guiding the laser beam, sandwiched by the lands disposed in parallel thereto and in a concentric fashion or in a spiral fashion at a constant pitch in a radial direction of the disc, the method wherein a plurality of virtual recording cells are assumed contiguously on the recording layer disposed on the groove and land in a rotational direction of the disc, the virtual recording cell being defined by a unit length in the rotational direction of the disc and a unit width perpendicular thereto; at least one of irradiation time and irradiation power of the laser beam is modulated for each virtual recording cell in five stages or more to change the size of a recording mark formed in the virtual recording cell; while at least the amount of reflected light in one stage obtained by the optical recording medium is being confirmed and a recording strength associated at least with the amount of reflected light in the stage is being corrected; and an optical reflectivity of the entire virtual recording cell is modulated in accordance with at least an area ratio of the recording mark to the virtual recording cell among the area ratio and optical transmittance of the recording mark, thereby recording information in multi-levels in five stages or more.

(56) An optical recording method for recording information on a disc-shaped optical recording medium with a groove and lands having a recording layer formed thereon, while the optical recording medium is being rotated, by irradiating the recording layer with a laser beam to form recording marks on the recording layer, the optical recording medium having the groove, for guiding the laser beam, sandwiched by the lands disposed in parallel thereto and in a concentric fashion or in a spiral fashion at a constant pitch in a radial direction of the disc, the method wherein a plurality of virtual recording cells are assumed contiguously on the recording layer disposed on the groove and land in a rotational direction of the disc, the virtual recording cell being defined by a unit length in the rotational direction of the disc and a unit width perpendicular thereto; at least one of irradiation time and irradiation power of the laser beam is modulated for each virtual recording cell in five stages or more to change the size of a recording mark formed in the virtual recording cell; before the virtual recording cell is irradiated with a laser beam with a recording strength of the laser beam being switched in five stages or more, the recording strength being at least one of irradiation time and irradiation power of the laser beam, part of the virtual recording cell is irradiated with the laser beam at least at a recording strength of those in the stages to form recording marks; the irradiation of the laser beam is performed while the recording strength of the laser beam is being corrected by comparing the amount of reflected light obtained from the virtual recording cell with the amount of reflected light on a recording mark of a predetermined reference virtual recording cell, and an optical reflectivity of the entire virtual recording cell is modulated in accordance with at least an area ratio of the recording mark to the virtual recording cell among the area ratio and optical transmittance of the recording mark, thereby recording information in multi-levels in five stages or more.

(57) An optical recording apparatus comprising a laser for delivering a laser beam, an irradiation controller capable of controlling the laser, an irradiation optical system for focusing the laser beam, and a servo mechanism for positioning at least the laser and the irradiation optical system to allow a predetermined position on a recording layer to be irradiated with the laser beam, the optical recording apparatus being capable of recording information by irradiating the recording layer with the laser beam to form recording marks thereon, wherein the irradiation controller is adapted such that a plurality of virtual recording cells are contiguously defined in a direction of movement relative to the laser beam on the recording layer, the virtual recording cell having a given unit length in the direction of movement and a given unit width perpendicular to the direction of movement; and the virtual recording cell is allowed to be irradiated with the laser beam with at least one of its irradiation time or irradiation power being controlled in five stages or more, the servo mechanism comprises a tilt sensor capable of measuring an amount of tilt of the virtual recording cell on the recording layer, and a tilt mechanism for tilt controlling at least the irradiation optical system so as to follow the amount of tilt to prevent a variation in angle of incidence of the laser beam to the recording layer, and five types of recording marks or more are formed with the laser beam in different sizes on the virtual recording cell; and information can be thereby recorded in multi-levels by making it possible to modulate the optical reflectivity of the entire virtual recording cell in five stages or more in accordance with the occupation ratio of the recording mark to the virtual recording cell.

(58) The optical recording apparatus according to claim 57, wherein the tilt mechanism portion of the servo mechanism tilt-controls the irradiation optical system such that the angle of incidence of the laser beam to the recording layer falls within a predetermined range.

(59) The optical recording apparatus according to claim 57 or 58, wherein the tilt mechanism portion of the servo mechanism tilt-controls the irradiation optical system when part of the recording layer on which the virtual recording cell is defined is irradiated with the laser beam.

In this invention, at least one of the irradiation time and the irradiation power of a laser is adjusted in multi-stages, thereby making it possible to control a reflectivity in multi-stages. That is, the irradiation time and the irradiation power of the laser are modulated and thereby the size of the record is modulated to vary in multi-stages the level of the optical reflectivity provided by the area ratio of the recording mark to a certain region (a virtual recording cell), thereby making it possible to perform multi-level recording. In addition, at this time, the unit length of the virtual recording cell in the rotational direction of the disc is adapted to have an arc length of the same center angle with respect to the center of the disc irrespective of positions in the radial direction of the disc, thereby making it possible to perform multi-level recording while the optical recording medium is rotated at a constant angular velocity. In comparison with a case where the optical recording medium is rotated at a constant linear velocity, this makes it possible to perform the recording and reading of data at high velocities, and the method for controlling the rotation is simplified to thereby allow for implementing high access time.

As already described, the inventor found it possible to perform multi-level recording by a new modulation technique or the occupation ratio of the recording mark to the virtual recording cell.

Based on this idea, it has been made clear that even a small recording mark, which may be generally said to be "incomplete", can function as a complete recording mark when the reflectivity of the entire virtual recording cell is modulated. As a result, it has been found possible to sufficiently perform multi-level recording even when the length of the virtual recording cell is set so that $0.10 \times (\lambda/NA) < H < 1.00 \times (\lambda/NA)$.

This makes it possible to achieve a recording density that would never be achieved by any conventional multi-level techniques so long as known to the inventor.

That is, in addition to an increase in recording density by multi-level recording or multi-value data, achieved are compactness of the virtual recording cell, an increase in recording density by setting a predetermined number of stages N, and an increase in recording velocity.

Now, the reason for selecting the aforementioned range is explained.

For example, to implement multi-level recording, it is necessary to set in multi-stages the occupation ratio of the recording mark to the virtual recording cell. To this end, however, required are an appropriate length H of the virtual recording cell and appropriate recording marks formed within the length H in multi-stages. Thus, longer virtual recording cells do not always work well. Too long virtual recording cells would cause recording marks to be formed accordingly, making it difficult to read multi-value data in accordance with the occupation ratio of the recording mark to the virtual recording cell. This is not rational from the viewpoint of recording density. It is clear that a high density recording can be achieved with the length H of the virtual recording cell being short. However, when a virtual recording cell is too short, it is difficult even to form a recording mark on the virtual recording cell. Thus, as a result of studies, it was made clear that the length H is highly necessary to be within the aforementioned range.

In addition, it is known that the length H of the virtual recording cell which is set within the aforementioned range as described above can make it possible in principle to perform multi-level recording. However, it has been found critical that the number of stages N of the recording mark requires the "balance" with the length H of the virtual recording cell. For example, it is possible to increase the recording density by setting the length H to be short and the number of stages N to be large therein. However, in practice, the number of stages N has a certain limit, causing the multi-level recording to be degraded in accuracy and an error occurrence rate to be increased when a certain range is exceeded.

On the contrary, that is, when the length H of the virtual recording cell is set to be as large as possible within the predetermined range and the number of stages N to be small, the recording density is eventually reduced to make the merit of multi-level recording unavailable. The consideration of the foregoing has led to the present invention.

In addition, using the new modulation technique or the occupation ratio of the recording mark to the virtual recording cell as described above has made it possible to drastically increase the recording density.

However, it has been found that forming a recording mark only by modulating the irradiation time or the irradiation power would not be enough to positively read the recording mark in some cases.

One of the reasons for this is that this recording scheme has to control the optical reflectivity of the entire virtual recording cell with high accuracy. According to a detailed study made by the inventor, in comparison with the conventional binary recording, the multi-level recording is more susceptible to curling of an optical recording medium, which is presumably one of the causes for an increase in error occurrence rate.

Among other things, suppose that the unit length of the virtual recording cell is set to be shorter than $0.65 \times (\lambda/NA)$, where NA is the numerical aperture of the objective lens of the irradiation optical system and $\lambda$ is the wavelength of the laser beam. At this time, it is assumed that a recording mark smaller than the beam spot is included. In this case, it is required for the center of the beam spot to pass along the center line of a plurality of virtual recording cells, defined contiguously, as accurately as possible. This is because, for a beam spot having its irradiation intensity of a Gaussian distribution, a recording mark is formed gradually from its center.

In this case, there occurs a wave aberration (mainly coma aberration or stigmatism) unless the optical axis of the irradiation optical system (e.g., the objective lens) is always maintained at a fixed relationship with the vertical line of the recording surface. This would cause the laser beam to converge insufficiently or the center of the beam spot to offset from the center of the virtual recording cell. Accordingly, there would occur errors in the position and size of the recording mark. This makes it difficult to set the occupation ratio of the recording mark to the virtual recording cell as predetermined, seriously affecting the optical reflectivity of the entire virtual recording cell.

To solve these problems, it is conceivable to increase the mechanical accuracy of the optical recording medium itself, that is, to prepare the optical recording medium so as to accommodate the amount of curling, the amount of shaking, and the angle of deflection within a predetermined range. According to experiments carried out by the inventor, for example, optical recording media of a CD type were fixed to a curling/shaking measuring device. It was confirmed that recording could be well performed if either the maximum (positive) displacement of the plane of the optical recording medium (within the range of 45 mm to 118 mm in diameter) in the direction perpendicular to the plane or the minimum (negative) displacement fell within the range of +/−0.3 mm with respect to a reference plane (an ideal plane present at 1.2 mm (above) in the axial direction from the chucking reference plane to the recording surface) (see CD-DA standards 6.1).

Furthermore, it was also confirmed that recording could be well performed if the width of shaking (the maximum shaking width, provided after a complete turn of the optical recording medium, in the direction perpendicular to the plane of the medium) measured according to the aforementioned method is 4 mm or less, that is, the amount of shaking in one direction is +/−0.2 mm or less with respect to a virtual average plane located at the middle of the shake (see CD-DA standards 6.2).

In addition, the optical recording medium was fixed to the curling/shaking measuring device. It was confirmed that recording could be well performed if an angle formed between the plane of the optical recording medium and the reference plane (the ideal plane present at 1.2 mm above the chucking reference plane) is 0.4 degrees or less within the range of 45 mm to 118 mm in diameter (see CD-DA standards 6.3).

However, preparing all optical recording media in this way would possibly cause the process to be significantly burdened with an increase in manufacturing cost.

In this context, the inventor et al made an attempt to perform recording well in terms of improving the recording and reading method.

The present invention allows a laser beam to follow the tilt of the recording layer upon forming recording marks, thereby making it possible to prevent variations in angle of incidence of the laser beam. This in turn makes it possible to form recording marks with accuracy on the center line of the virtual recording cell. As a result, the error in optical reflectivity of the virtual recording cell caused by the inclination of the recording layer is prevented, thereby achieving multi-level recording with less error rates. Incidentally, the present invention is not limited to a case where the optical axis of the laser beam is perpendicular to the recording layer but also includes a case where the optical axis is optimized to be always at a certain angle to the perpendicular line.

The foregoing has been confirmed to be useful and noticeable particularly in the case of modulating an optical reflectivity in five stages or more to record information (in comparison with cases of the number of stages less than that). Incidentally, the present invention is not limited to a case where the control of the angle of incidence is performed on the entire region of the optical recording medium but also includes cases where the control is performed only on a particular region of the optical recording medium (e.g., on a region where curling readily occurs).

BRIEF DESCRIPTION OF THE DRAWINGS

FIG. 9 is a schematic cross-sectional view illustrating a recording state in which a recording mark is formed on a virtual recording cell without tilt control;

FIG. 10 is a schematic cross-sectional view illustrating the state in which a recording mark is read without tilt control;

DETAILED DESCRIPTION OF THE PREFERRED EMBODIMENTS

Figure 1:
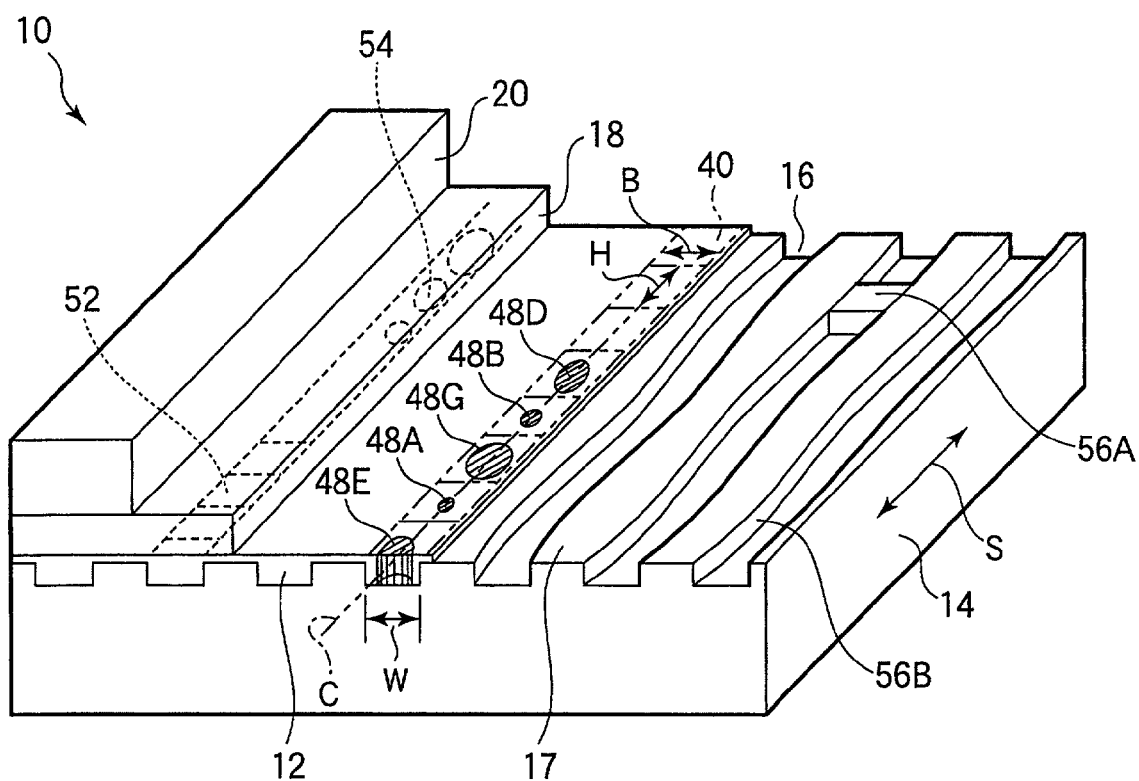
FIG. 1 is a partially exploded perspective view illustrating the main portion of an optical recording medium according to an embodiment of the present invention.

Now, the present invention will be explained below in more detail with reference to the accompanying drawings in accordance with the embodiments.

An optical recording medium 10 according to an embodiment of the present invention is a CD-R with a recording layer 12 made of a dye material or a CD-RW using a phase changing material. For example, the CD-R comprises a substrate 14 made of a transparent base material and the recording layer 12 made of a dye applied to cover a groove 16 for guiding a laser beam that is formed on one surface of the substrate 14 (on the upper surface in FIG. 1). The CD-R further comprises a reflective film 18, made of gold, silver or the like, formed through sputtering or the like on the upper side of the recording layer 12, and a protective layer 20 that covers the outside of the reflective film 18. For example, the CD-RW is adapted to comprise a lower protective layer (a dielectric layer) formed at least through deposition to cover the groove 16, a recording layer made of a phase changing material, an upper protective layer (a dielectric layer), a light reflective layer, and the protective layer 20 to cover these layers.

The groove 16 is formed in a spiral or concentric fashion about the center of the shape of the disc and at an equal pitch in the radial direction of the disc. Also formed are lands 17 continuous spirally or concentrically in parallel to the groove 16 adjacent thereto in the radial direction.

The dyes employed for the recording layer 12 include cyanine, merocyanine, and methine base dyes, and their derivatives. Also included are a metal complex of benzene thiol, and organic dyes such as phthalocyanine dye, naphthalocyanine dye, and azoic dye. The phase changing materials include GeSbTe base and AgInSbTe base materials in general.

Figure 2:
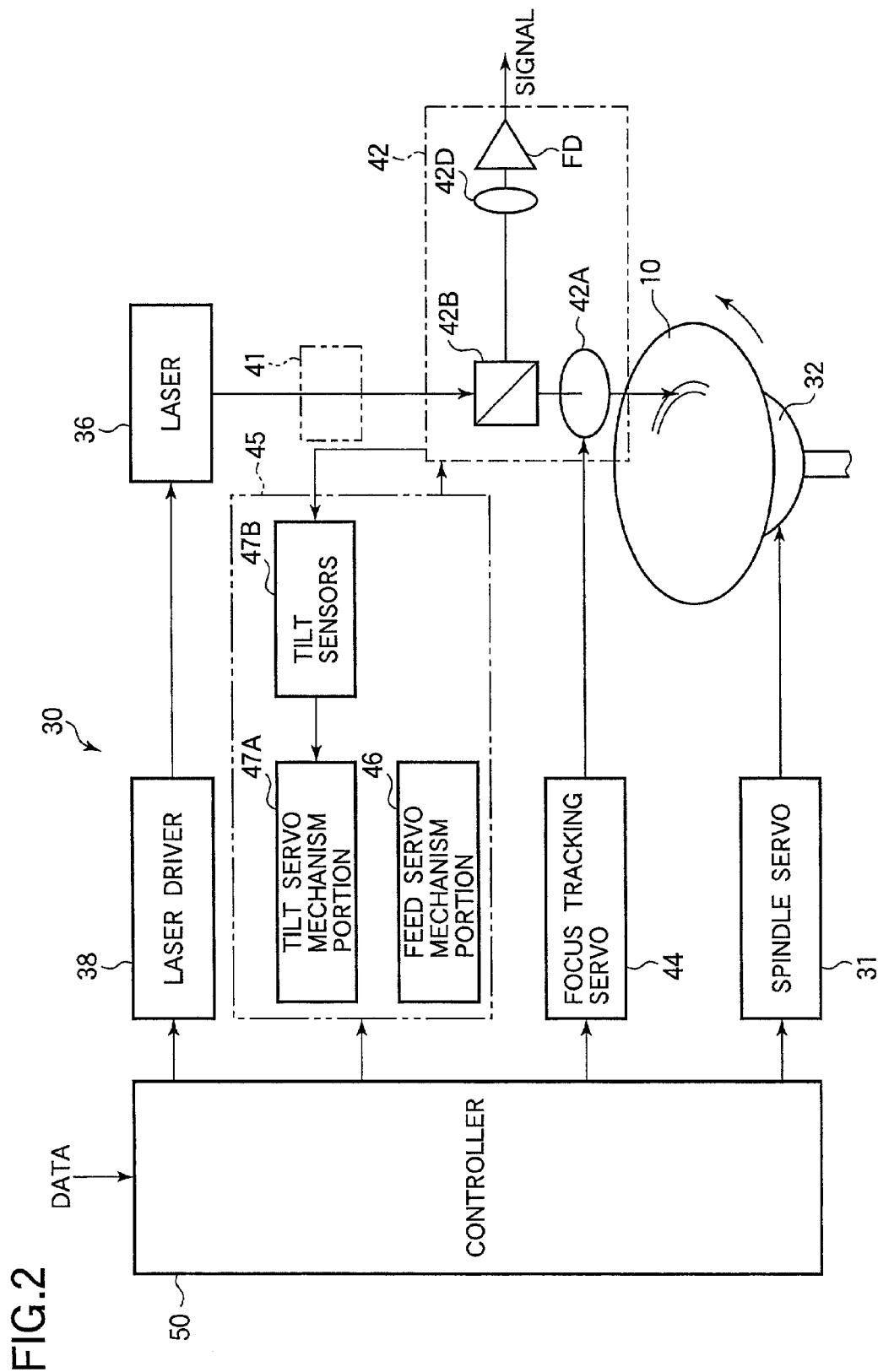
FIG. 2 is a block diagram illustrating an optical recording apparatus for recording information on the optical recording medium using a laser beam.

A multi-level recording of the optical recording medium 10 is performed with the optical recording apparatus 30 shown in FIG. 2.

The optical recording apparatus 30 is a CD-R/RW recorder, adapted to rotatably drive the optical recording medium (disc) 10 in a condition of a constant angular velocity with a spindle motor 32 via a spindle servo 31 and then record information on the recording layer 12 formed as described above of the optical recording medium (disc) 10 with a laser beam from a laser 36.

The laser 36 is adapted such that in response to information (data) to be recorded, a laser driver (irradiation controller) 38 controls the irradiation time of a laser beam per one virtual recording cell (described later) 40, shown in FIGS. 1 and 3, such as the number of laser pulses or the irradiation power such as the laser pulse height or concentration.

Reference numeral 42 of FIG. 2 is a recording optical system that includes an objective lens 42A, a half mirror 42B, a light-receiving objective lens 42D, and a light-receiving device FD. The objective lens 42A is subjected to focus tracking control provided by a focus tracking servo 44 such that the laser beam is focused on the recording layer 12. The light reflected from the optical recording medium 10 is refracted generally at a right angle with the half mirror 42B, and then converged with the light-receiving objective lens 42D to be incident upon the light-receiving device FD, being read as a multi-level signal. The entire irradiation optical system 42 is positioned with a servo mechanism 45. That is, the photodiode FD detects recording signals. In addition, the objective lens 42A, the half mirror 42B, the light-receiving objective lens 42D, and the photodiode FD servo mechanism 45 are controllably moved with a feed servo 46 in phase with the rotation of the disc 10 at a predetermined velocity from the inner to outer circumference.

The spindle servo 31, the laser driver 38, the focus tracking servo 44, and the feed servo 46 are controlled by means of a controller 50. The data (information) to be recorded onto the recording layer 12 is input into the controller 50.

Now, the virtual recording cell 40 and the recording mark to be recorded on the virtual recording cell 40 are explained.

The virtual recording cell 40 is defined by the unit width in the radial direction of the recording medium and the unit length in the rotational direction. The unit width is less than or equal to the beam waist of a laser beam in the innermost circumference, such as the track pitch or groove width of the disc 10 that can be selected arbitrarily.

More specifically, as shown in FIG. 1, a plurality of virtual recording cells 40 according to this embodiment are defined continuously in a spiral or concentric fashion, on the recording layer 12 inside the groove 16, with the unit length in the rotational or circumferential direction of the disc 10 and with the width equal to that of the groove 16.

Figure 3:
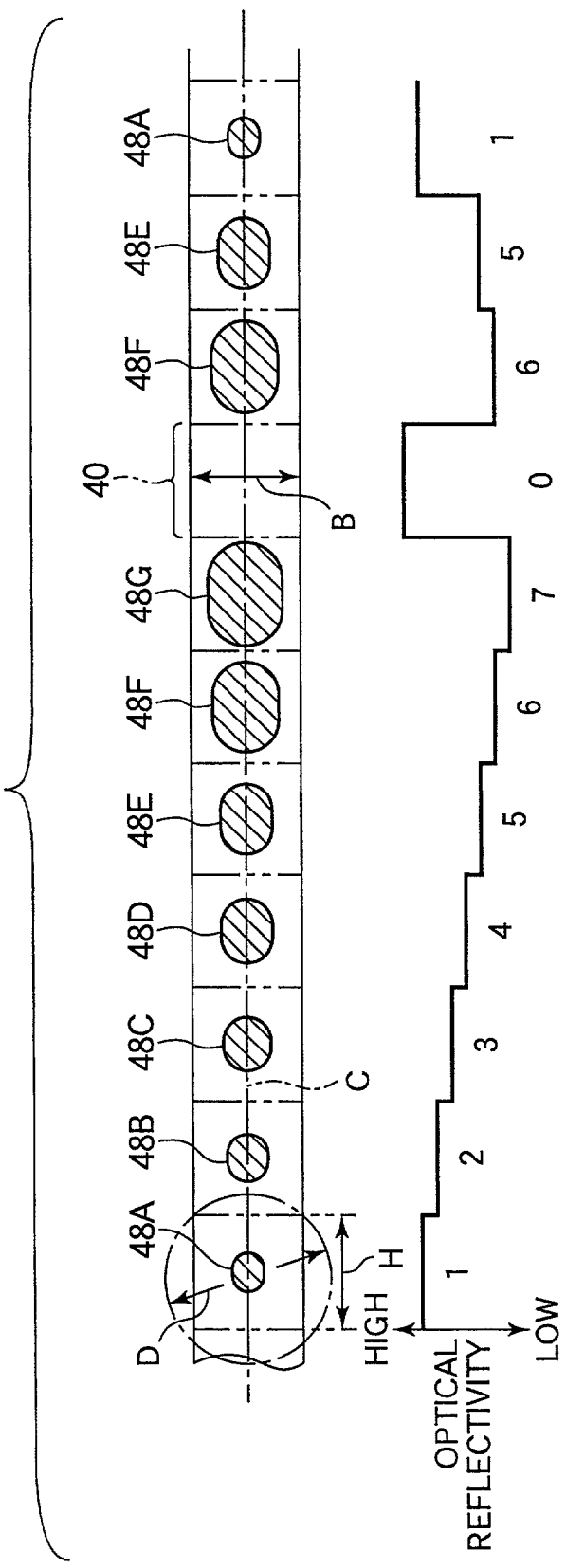
FIG. 3 is a schematic view illustrating the relationship between a recording mark, a virtual recording cell, and their optical reflectivities upon forming the recording mark on the recording layer using the optical recording apparatus.

Each of the virtual recording cells 40 is irradiated with a laser beam, thereby forming recording marks 48A to 48G, exemplified schematically in FIG. 3, in response to information to be recorded.

The unit length is set such that a center angle 0 with respect to the center of the disc has the same arc length irrespective of the position of the virtual recording cell 40 in the radial direction of the disc. In addition, an absolute length is adapted to be shorter (in the circumferential direction) than the beam diameter (the diameter of the beam waist) D in the innermost side in the radial direction of the disc. Therefore, the unit length of the virtual recording cell 40 is longer towards the outside in the radial direction of the disc. Thus, the times for scanning across each of the virtual recording cells 40 with a laser beam are equal to each other when the optical recording medium 10 is rotated at a constant angular velocity on each of the virtual recording cells 40.

Here, the beam diameter D of the laser beam emitted from the laser 36 at the recording layer 12 is greater than the width of the virtual recording cell 40 however, by selecting a material of the recording layer 12, it is possible to form, at the center portion of the laser beam, the recording marks 48A to 48G having different diameters in response to the laser irradiation time or the irradiation power. Incidentally, the recording marks 48A to 48G are formed not on the entire portion but at the center portion of the laser beam (the laser beam is circular in shape, however, the recording marks are elliptical in response to the irradiation time since the optical recording medium 10 is irradiated with the laser beam while being rotated).

This is because a focused laser beam has in general a Gaussian distribution, however, only such a portion of the laser beam having an irradiation energy greater than a threshold value performs recording on the recording layer 12, thereby allowing the recording marks 48A to 48G to be formed as expand from the center to outside in sequence. This causes the spot size of the laser beam available for recording the recording layer 12 to vary by changing the irradiation time or the irradiation power of the laser beam. For example, as shown in FIG. 3, this makes it possible to form seven stages of recording marks 48A to 48G of different occupation ratios to the virtual recording cell 40.

In this case, the size of each of the recording marks 48A to 48G is set such that when the virtual recording cell 40 is irradiated with a laser beam for reading operations, the reflected light takes seven stages of optical reflectivity. The optical reflectivity increases as the recording mark decreases in size, with the maximum reflectivity in a virtual recording cell having no recording mark formed thereon and the minimum reflectivity in a virtual recording cell having the maximum recording mark 48G formed thereon.

In more detail, the optical reflectivity is set in consideration of the area ratio of each of the recording marks 48A to 48G to the virtual recording cell 40 and the optical transmittance of the recording mark itself. That is, the optical reflectivity is conceivably determined with the ratio of occupation to the virtual recording cell 40 including an optical reflectivity of each of the recording marks 48A to 48G.

The optical transmittance of the recording marks 48A to 48G themselves varies depending on a change in refractivity of the material forming the recording layer 12, the change being caused when the material is irradiated with a laser beam and thereby decomposed and degraded resulting in a different crystalline state, or depending on the amount of change of the recording layer 12 in the thickness direction. If the recording mark portions formed are zero in optical transmittance, then there is no need to take it into consideration but to follow only the aforementioned ratio of occupation.

As a result, a good multi-level recording can be performed on the optical recording medium 10 by controlling the irradiation time.

As described above, the unit length of the virtual recording cell 40 is longer towards the outer side in the radial direction of the disc. Thus, the times for scanning across each of the virtual recording cells 40 are equal to each other when the optical recording medium 10 is rotated at a constant angular velocity on each of the virtual recording cells 40.

Therefore, the relative velocity or the recording linear velocity of each virtual recording cell 40 with respect to the laser beam is greater towards the outside in the radial direction of the disc. When the irradiation time of the laser is modulated in multiple stages, a recording mark formed with the longest irradiation time is followed by a spacing which becomes larger towards the outside in the radial direction of the disc. Larger spacings would allow for more stages of modulation.

Corresponding to this, however, it is necessary to increase the recording laser power itself. That is, the laser power is increased to compensate for a reduction in the amount of light with which unit area is irradiated, the reduction being caused by increasing distance of movement per unit time.

Figure 4:
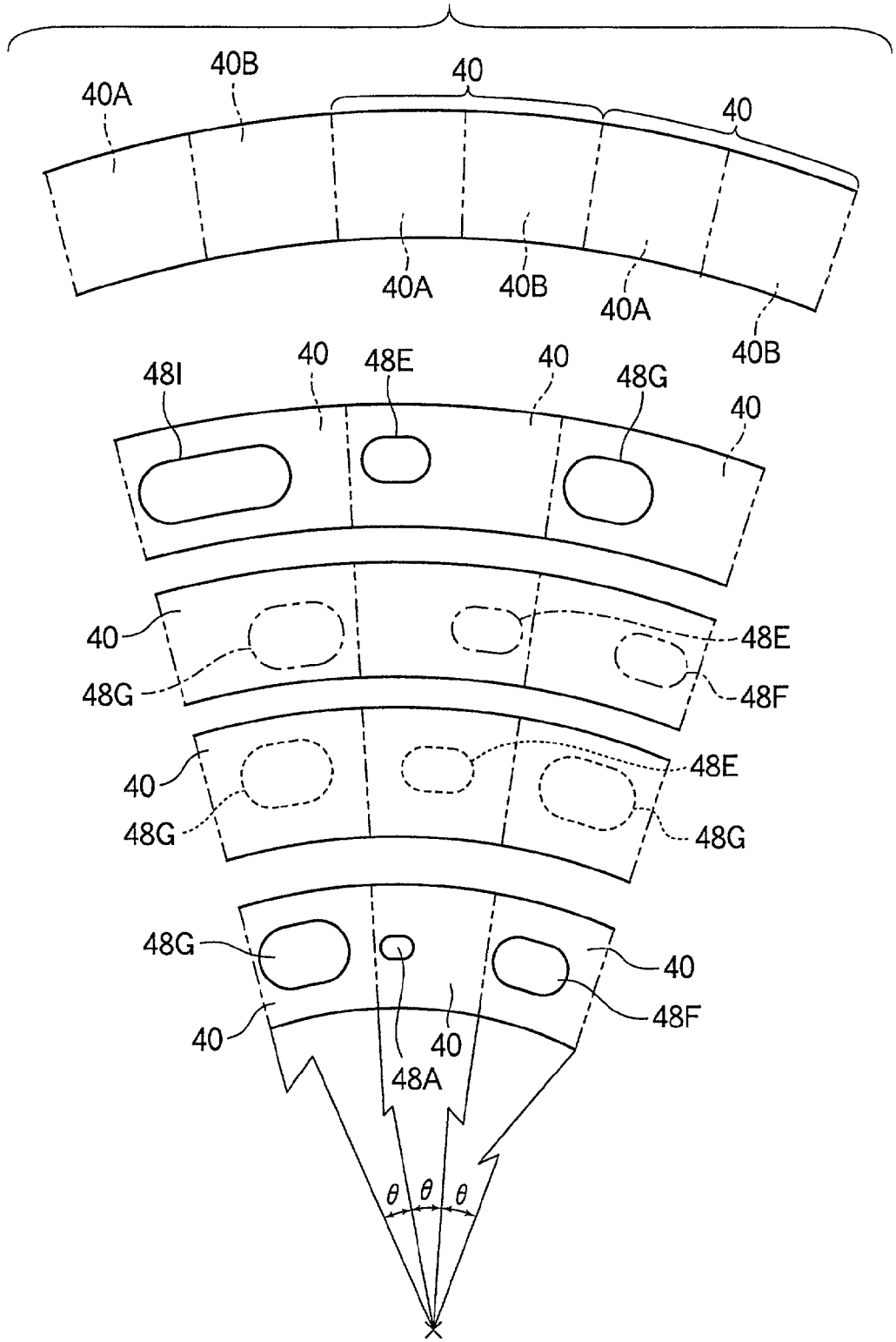
FIG. 4 is a schematic view illustrating another setting of virtual recording cells in an optical recording medium.

For example, as schematically shown in FIG. 4, when the laser irradiation time is allowed to be modulated in seven stages within the inner region in the radial direction of the disc or the optical recording medium 10, it is possible to modulate the laser irradiation time in eight or nine stages within the outer region in the radial direction of the disc.

Furthermore, suppose that the length of a cell, which becomes longer towards the outer circumference of the disc, is twice or more the length of the shortest cell that is set at the innermost circumference of the disc. In this case, as shown at the uppermost portion of FIG. 4, it is possible to divide a virtual recording cell into two separate virtual recording cells 40A, 40B. This makes it possible to improve the recording density.

Furthermore, setting a virtual recording cell under the condition of a constant angular velocity as described above causes the next groove adjacent to the cell across a land in the radial direction to have the same position at which the virtual recording cell starts. This shows the possibility of occurrence of a phenomenon such as cross talk upon reading or writing a signal. In such a case, with the position of the virtual recording cell remaining unchanged, the signal starting position within the virtual recording cell is divided to be aligned with the leading end as shown with a solid line in FIG. 4, with the center as shown with a dashed line, and with the trailing end as shown with alternate long and short dashed lines. This makes it possible to overcome the phenomenon. The data (information) to be recorded onto the recording layer 12 is input into the controller 50, while the signal read by the photodiode FD is processed by the controller 50.

Figure 5:
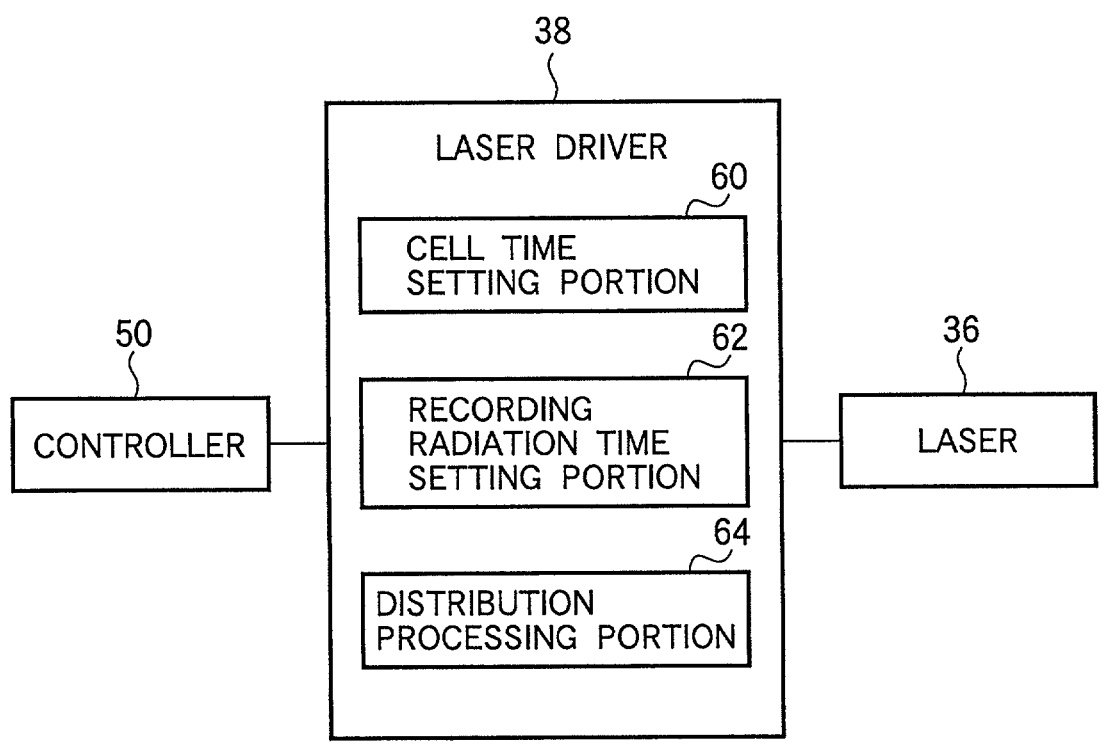
FIG. 5 is a block diagram illustrating the configuration of a laser driver incorporated into the optical recording apparatus.

As specifically shown in FIG. 5, the laser driver 38 comprises a cell time setting portion 60, a recording irradiation time setting portion 62, and a distribution processing portion 64.

The cell time setting portion 60 defines predetermined cell times T continuously (T1, T2, T3, T4, T5, T6, . . . ). As a result, for example, virtual recording cells 40 are contiguously defined which have a length of H equal to "v×T" on the optical recording medium 10, where v is the movement velocity (linear velocity) of the optical recording medium 10 with respect to the laser 36.

The unit length H of the virtual recording cell 40 is set as follows.

That is, the unit length H is set so that $0.10\times(\lambda/NA) <H<1.00\times(\lambda/NA)$, where $\lambda$ is the wavelength of the laser beam emitted from the laser 36 and NA is the numerical aperture of the objective lens 42A in the recording optical system 42. For example, since $\lambda=785$(nm) and NA=0.5 in this embodiment, the unit length H is so set as to be greater than 157(nm) and less than 1570(nm).

That is, the linear velocity v is determined by controlling the number of times of revolutions of the spindle motor 32. The unit length $H(=v\times T)$ is contiguously defined within the aforementioned range by setting the cell time T to a predetermined value with the cell time setting portion 60 of the laser driver 38. Incidentally, such a case is shown here in which the linear velocity v is supposed to be constant. Since the angular velocity is constant in the present invention as described above, this may be variable. Similarly, the cell time T may also be made variable to perform control such that the unit length H of the virtual recording cell 40 always falls within the aforementioned range. In addition, the unit length H needs not to fall within the aforementioned range across the entire recording surface of the optical recording medium 10. The present invention includes such cases where the unit length H is partly set within the aforementioned range.

The recording irradiation time setting portion 62 defines irradiation times tA, . . . , tG in predetermined N stages (here seven stages of tA to tG) within the aforementioned cell time T. In this case, the irradiation times tA, . . . , tG may be prerecorded and then read out, thereby providing the definition. Alternatively, information on irradiation times that has been recorded in the optical recording medium 10 may be read out to thereby provide the definition.

The aforementioned number of stages N is set as follows.

That is, with respect to the unit length H (nm) of the virtual recording cell 40 that has been already set, the number of stages N is set to satisfy the range such that 40<H/N<100. For example, suppose that the length H is set to $50*10^{-6}$ (m) (500 (nm)) In this case, the number of stages N is set to any one of the ranges of 6 to 12.

The distribution processing portion 64 modulates original information stored in the controller 50 to set a bit train for multi-level recording, and then assigns the bit train to each cell time T. For example, the multi-level bit train is {B, E, D, C, G, G, . . . } because of the presence of recording marks of seven stages (A, B, C, D, E, F, and G) in this case. Each of these numerical values means the level of recording mark to be formed on each recording cell 40. Accordingly, the aforementioned irradiation time tA to tG is assigned to each cell time T1, T2, . . . so as to correspond to each level of the aforementioned bit train.

As shown in FIG. 1, on the optical recording medium 10, the virtual recording cells 40 are contiguously defined in the groove 16 in circumferential direction S of a disc 34.

In addition, the unit width B of the virtual recording cell 40 perpendicular to the unit length $H(=v\times T)$ is tentatively set to be shorter in length than the beam diameter (the diameter of the beam waist) D as follows.

That is, the unit width B is set so that $0.20\times(\lambda/NA) <W<0.40\times(\lambda/NA)$, where $\lambda$ is the wavelength of the laser beam emitted from the laser 36 and NA is the numerical aperture of the objective lens 42A in the recording optical system 42. For example, since $\lambda=785$(nm) and NA=0.5 in this embodiment, the unit width B is set within the range of $0.31<W<0.63(\mu m)$.

The width W of the groove 16 is also set so as to be slightly less than the unit width B of the virtual recording cell 40. The groove depth is 70 to 300 nm, preferably 100 to 250 nm.

In this embodiment, the spacing P between adjacent grooves 16 (track pitch) is set so that $0.5\times(\lambda/NA)<P<1.2\times (\lambda/NA)$. Incidentally, the unit length H of the virtual recording cell 40 is so set that $H<0.65\times(\lambda/NA)$, and H<1.02 under the aforementioned condition.

Under the conditions described above, each of the virtual recording cells 40 is irradiated with the laser beam to form the schematically exemplified recording marks 48A to 48G in response to the information to be recorded.

More specifically, the recording marks 48A to 48G are formed so as to include the following steps.

To record actual information onto the optical recording medium 10, the unit length H of the virtual recording cell 40 is defined as already described in setting the cell time T in order to set the irradiation time tA to tG of the laser beam for each virtual recording cell 40.

Figure 6:
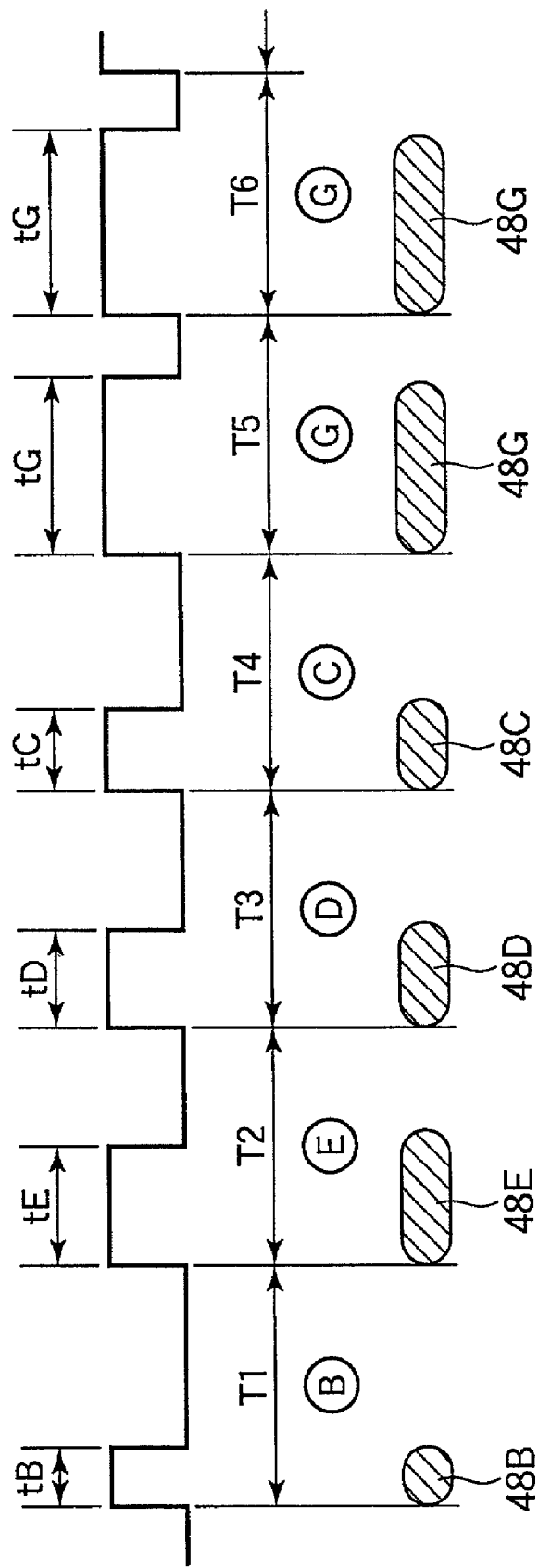
FIG. 6 is a diagram illustrating the process of generating a timing chart of a laser beam irradiation upon forming the recording mark on the recording layer using the optical recording apparatus.

As a result, as shown in the time chart of FIG. 6, the irradiation times {tB, tE, tD, tC, tG, tG, . . . } are assigned to the cell times T1, T2, T3, . . . , respectively, corresponding to the bit train {B, E, D, C, G, G, . . . } obtained by modulating original information. Incidentally, such a case is shown here where the irradiation time t is set from the head of each cell time T (i.e., with respect to the front end). However, in some cases, the irradiation time is set to the middle of each cell time T (with respect to the middle) or the irradiation time is set with respect to the tail of each cell time T (with respect to the tail end).

Actual formation of recording marks 48A to 48G, being irradiated with the laser beam at the irradiation time t in accordance with this time chart, makes it possible to set each virtual recording cell 40 to a desired optical reflectivity.

The virtual recording cell 40 having the unit length H to be set within the predetermined range is in general less than the outer diameter D of a laser beam spot, based on no precondition of forming a recording mark greater than the laser beam spot as in the case of the prior art (although it can be recorded). That is, from the conventional viewpoint, a recording mark which might be supposed to be in an incomplete recording state is employed as completed recording marks 48A to 48G. This has been brought by a new idea of modulating not the optical reflectivity of the recording marks 48A to 48G themselves (their contents.) but the entire optical reflectivity of the virtual recording cell 40 with the occupation ratio of the virtual recording cell 40 to the recording marks 48A to 48G to be formed therein.

This makes it possible to achieve an increase in recording density in multi-level recording but also an increase in recording density due to a reduction in size of the recording marks 48A to 48G and an improvement in recording velocity.

Furthermore, in this embodiment, the number of stages N of recording marks 47A to 47G is set within a predetermined range and therefore is well balanced with the length of the virtual recording cell 40. That is, with the length H being short, the upper limit of the number of stages N is less restricted, thereby making it possible to maintain multi-level recording with high accuracy. In addition, with the length H being long, the number of stages N is prevented from being set to be small, thereby making it possible to prevent the recording density from being reduced.

The servo mechanism 45 comprises the feed servo mechanism portion 46, a tilt servo mechanism portion 47A, and a tilt sensor 42B. The feed servo mechanism portion 46 controllably moves the recording optical system 42 radially from the inner to outer circumference in sync with the rotation of the optical recording medium 10. The tilt sensor 42B measures the amount of tilt of the optical recording medium 10 and inputs the resulting signal into the tilt servo mechanism portion 47A. The tilt servo mechanism portion 47A controllably tilts the recording optical system 42 in accordance with the aforementioned signal to align the optical axis of the recording optical system 42 with the vertical line of the optical recording medium 10 (the vertical line of the virtual recording cell 40). Incidentally, the recording optical system 42 itself is controlled by a controller which is not particularly illustrated.

Figure 7:
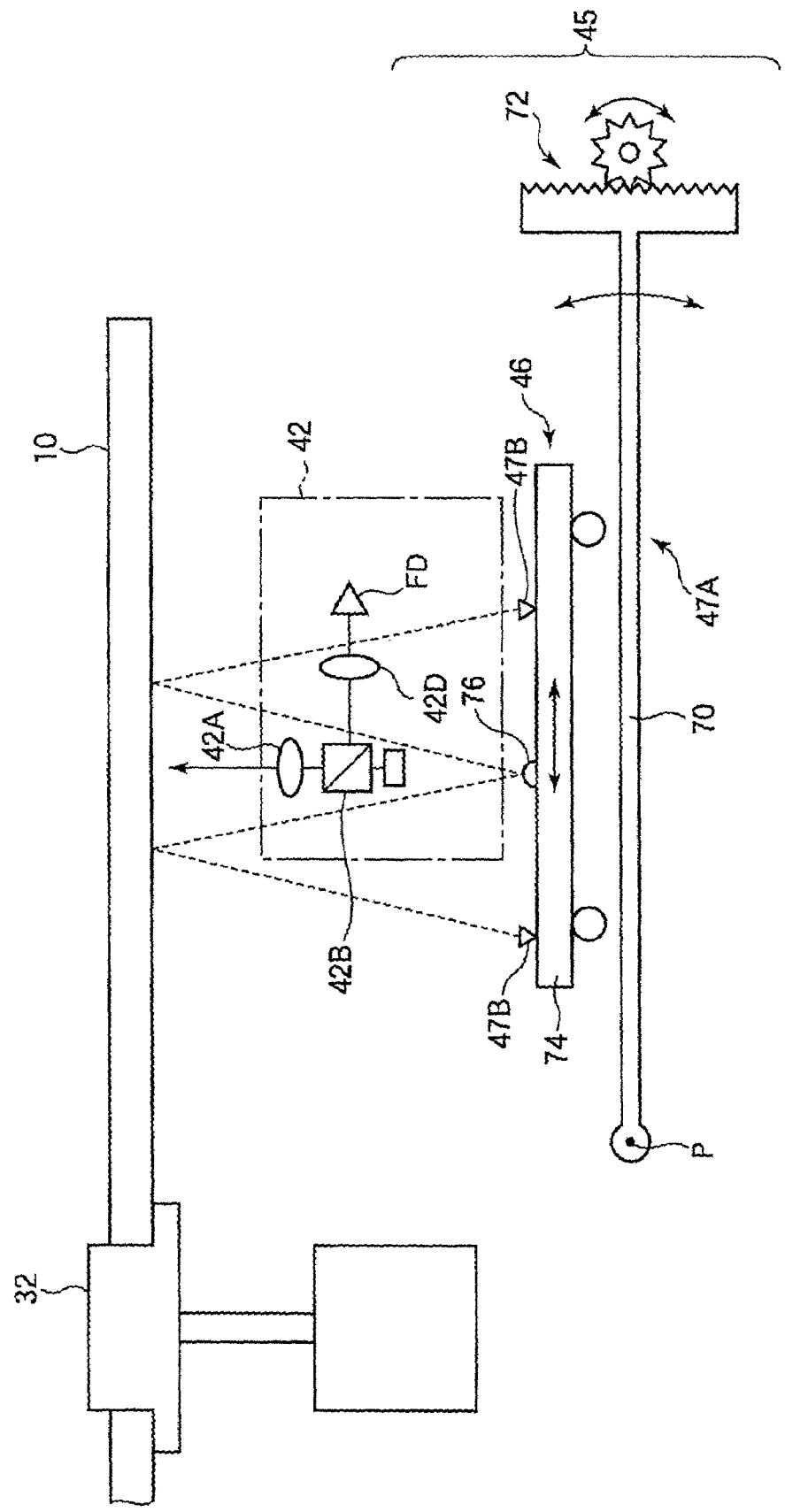
FIG. 7 is a block diagram illustrating the configuration of a servo mechanism incorporated into the optical recording apparatus.

FIG. 7 is an enlarged view illustrating the recording optical system 42 according to this embodiment.

The tilt servo mechanism portion 47A comprises a slider 70 that is provided rockably about fulcrum P provided at an end, a rack & pinion 72 that is provided vertically slidably at the other end of the slider 70. The slider 70 is tilted to allow the recording optical system 42 to follow the tilt of the optical recording medium 10. Incidentally, the longitudinal direction of the slider 70 is aligned with the radial direction of the optical recording medium 10.

The feed servo mechanism portion 46 comprises a table 74 that is movable on the slider 70, being controllably moved by a drive device that is not particularly illustrated. The table 74 has the recording optical system 42 mounted thereon. The table 74 has also a tilt angle detecting laser 76 for directing a laser beam at the optical recording medium 10, and at least two tilt sensors 47B for detecting the light of the laser beam reflected from the optical recording medium 10. It is possible to detect the offset between the vertical line to the recording layer 12 of the optical recording medium 10 and the optical axis of the recording optical system 42 in accordance with the difference in the amount of the reflected light between both the tilt sensors 47B.

Incidentally, the amount of offset between the vertical line to the recording layer 12 and the optical axis is to be measured here, however, the tilt angle of the recording layer 12 may be made directly measurable. In addition, such a case is shown here where the vertical line and the optical axis are aligned with each other, however, the present invention also includes cases where they are always at a certain angle to each other.

According to the optical recording technique of the aforementioned embodiment, it is possible to control the irradiation time and thereby achieve multi-level recording in five stages or more while performing tilt control on the recording optical system 42.

The tilt control is a critical factor in multi-level recording as such because of the following reasons.

Figure 8:
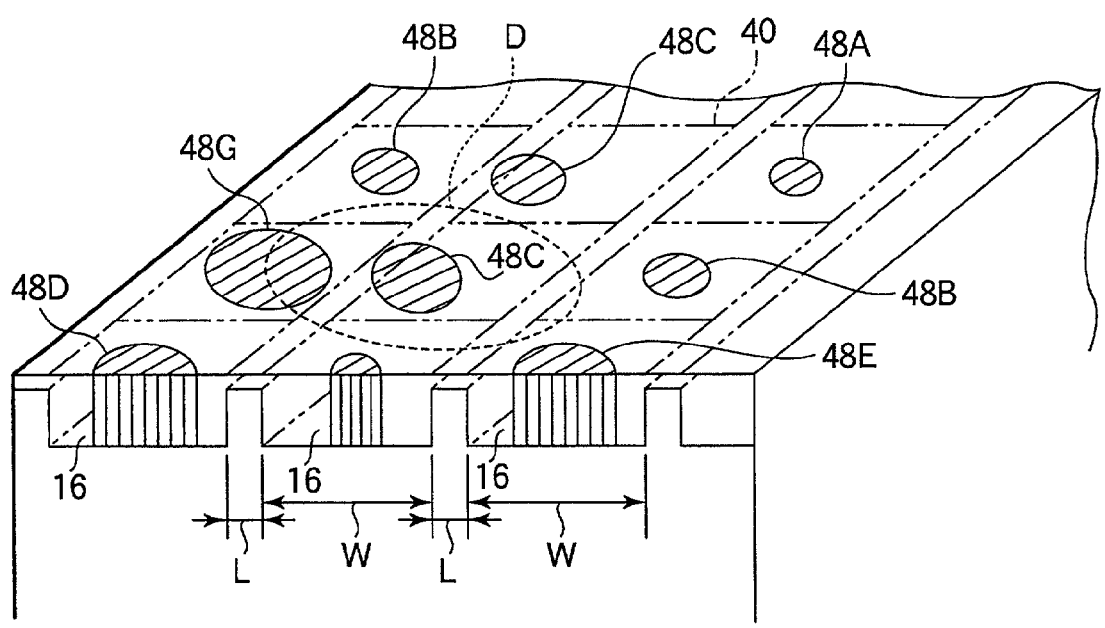
FIG. 8 is a perspective view illustrating the state in which a multi-level recording is performed on an optical recording medium without tilt control.

FIG. 8 illustrates the state of formation of recording marks 48A to 48G without the tilt control. In the multi-level recording technique of modulating an optical reflectivity with the occupation ratio of the recording marks 48A to 48G to the virtual recording cell 40, the recording marks 48A to 48G could be possibly smaller than the laser beam spot D. Accordingly, it is highly possible that the recording marks 48A to 48G are formed beyond the virtual recording cell 40 only with a slight dislocation of the laser beam spot due to the coma aberration caused by curling in the optical recording medium 10. As a result, the occupation ratio of the recording marks 48A to 48G to the virtual recording cell 40 is not set as predetermined, resulting in an error in the entire optical reflectivity.

Furthermore, the phenomenon characteristic of the formation of the recording marks 48A to 48G is estimated such that recording is well performed with no curling as shown in FIG. 9(A), whereas the recording marks 48A to 48G are tilted with large curling as shown in FIG. 9(B). Although schematically illustrated, these would present no problem if caused by the presence or absence of a signal as in the conventional binary recording. However, since the occupation ratio of the recording marks 48A to 48G is set in multi-stages with high accuracy in the case of the multi-level recording, a jitter component (offset in signal) of a recording signal at a shallow position or jitter component at a deep position would increase jitter in total (increase the error in the occupation ratio), thereby making it difficult to perform recording well.

In addition, the phenomenon characteristic of reading operations is also estimated such that a good read signal is obtained with no curling as shown in FIG. 10(A), whereas the adjacent recording marks 48A to 48G are also read with large curling as shown in FIG. 10(B), thereby being more seriously affected by cross talk. This phenomenon results in degradation of read signals.

On the other hand, in this embodiment, the tilt sensors 47B are used to detect the shift (the shift angle) between the optical axis of a laser beam for recording or reading operations and the vertical line to the recording layer 12 (the virtual recording cell 40) of the optical recording medium 10, and the tilt control is performed on the recording optical system 42 so as to always minimize the shift. Thus, it is possible to accurately form the recording marks 48A to 48G along center line C of each of the virtual recording cells 40 (see FIG. 1).

As a result, the entire optical reflectivity of the virtual recording cell 40 can be set with high accuracy. In addition to this, it is also made possible to make the virtual recording cell 40 more compact in size (especially in the width direction), thereby allowing for dramatically improving the recording density of the optical recording medium 10.

For example, the unit width B of a virtual recording cell can be set less than $0.5 \times (\lambda/NA)$, and the track pitch can also be set less than $0.7 \times (\lambda/NA)$, where NA is the numerical aperture of the objective lens in the recording optical system 42 and $\lambda$ is the wavelength of a laser beam.

In addition, suppressing the error (shift) in optical reflectivity of the entire virtual recording cell 40 as described above would make it possible to reduce the width between level stages and thereby increase the total number of levels (seven stages of A to G here). This in turn allows for further increasing the recording density of the optical recording medium.

Figure 11:
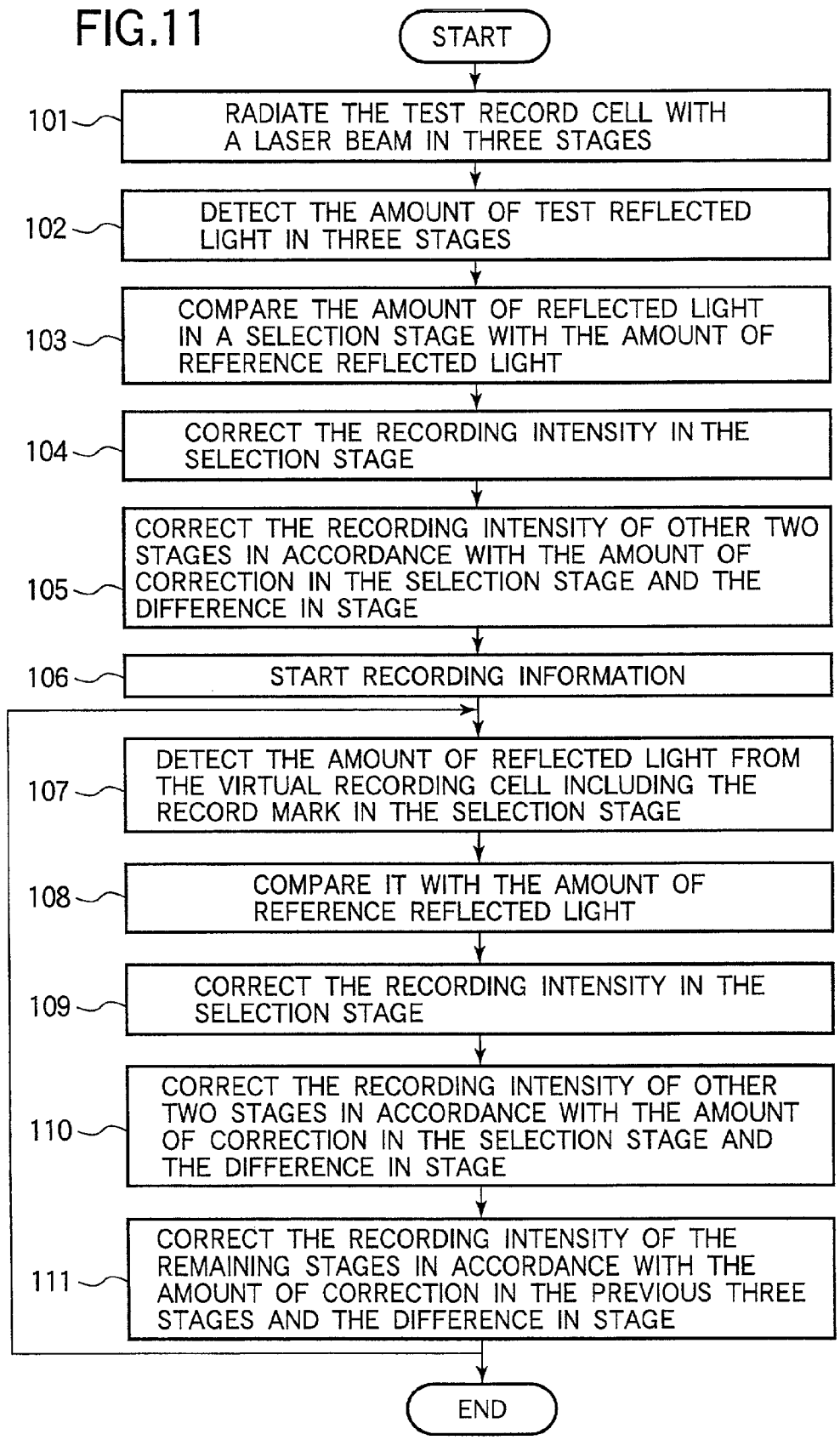
FIG. 11 is a schematic perspective view illustrating a case where a laser beam for irradiating a virtual recording cell therewith has another shape.

Now, referring to FIG. 11, explained are OPC and running OPC for performing compensation to provide a proper strength for a laser beam upon recording information on the optical recording medium 10.

Incidentally, it is to be understood here that the recording strength of a laser beam is controlled with the density of the laser pulse for irradiating one virtual recording cell 40, that is, with the irradiation time of the laser beam.

First, at step 101, a test virtual recording cell (not shown) in a test area of the disc 10 is irradiated with a laser beam at recording strengths associated with the second, fourth, and sixth recording strength of those of the seven stages, that is, the recording marks 48B, 48D, and 48F, thereby forming three stage test recording marks of different sizes.

Then, the process proceeds to step 102, where the amount of test reflected light from each test virtual recording cell on which the test recording mark is formed is detected with the photo-detector 42D and then the detected value is delivered to the controller 50.

Then, at step 103, in the controller 50, of the amounts of the test reflected light of three types detected, the amount of test reflected light corresponding to the intermittent recording mark 48D is set as the amount of test reflected light in the selection stage. The amount of reference reflected light, at which the laser driver 38 is pre-set corresponding to the recording strength in the selection stage in the controller 50, is compared with the amount of the test reflected light in the selection stage. At step 104, the recording strength in the controller 50 is corrected such that the amount of the reflected light in the selection stage equals the amount of the reference reflected light in response to the result of the comparison. At step 105, the recording strength of the other two stages is corrected such that the difference between the amounts of test reflected light corresponding to the recording strengths of the other two stages and the amount of the reference reflected light corresponds to the difference between the stages.

At step 106, information recording is started. In the following steps, first, at step 107, the amount of light is detected as required which is reflected from the virtual recording cell that has been irradiated with a laser beam having a recording strength provided in the selection stage to form recording marks thereon. Then, at step 108, the detected value and the reference reflected light that has been set are compared with each other. At step 109, in accordance with the difference between both the amounts, the recording strength provided in the selection stage is corrected such that the amount of reflected light equals to the amount of reference reflected light. At step 110, the recording strengths of the other two stages are corrected similarly. Furthermore, at step 111, multi-level recording is performed while the recording strengths corresponding to the remaining recording marks 48A, 48C, 48E, and 48G are corrected in response to the difference between stages (the difference between two stages) in accordance with the recording strengths of the three stages that have been corrected.

Furthermore, the recording strength of the laser beam upon recording operations may be kept constant from the time of correction until the amount of reflected light is shifted by a predetermined amount.

As a result, for the aforementioned multi-level recording in five stages or more, it is possible to distinguish the difference between respective recording stages, that is, the absolute difference in reflectivity of the virtual recording cell 40 between the respective stages even when the state of recording layer 12 of the optical recording medium 10 has been changed.

Incidentally, the aforementioned embodiment is based on the amount of test reflected light of the intermediate selection stage from the amounts of three stages of test reflected light, however, the present invention is not limited thereto but may be based on the amount of another stage of test reflected light. However, an adjustment with reference to the amount of the intermediate stage of test reflected light could be made more easily. In addition, the amount of test reflected light may be in four stages or more.

Incidentally, in the aforementioned embodiment, the length (the unit length) of the virtual recording cell 40 in the circumferential direction of the disc is the shortest at the innermost region in the radial direction of the disc. However, the shortest length is preferably of the order of the beam waist diameter at the intermediate position in the radial direction of the disc if the shortest length can have a given length equal to the beam waist of the laser beam or less.

In addition, the virtual recording cell 40 may be set to be generally equal in length to a recording mark formed at a threshold of irradiation energy greater than provides a change to the recording layer 12 when irradiated by the laser beam for the longest period of time.

Furthermore, as explained below, suppose that the size of the laser beam in the longitudinal direction of the virtual recording cell 40 can be reduced. In this case, the unit length of the virtual recording cell 40 at the outermost position in the radial direction of the disc or the recording medium 10 can be made less than or equal to the beam waist diameter of the laser beam.

Figure 12:
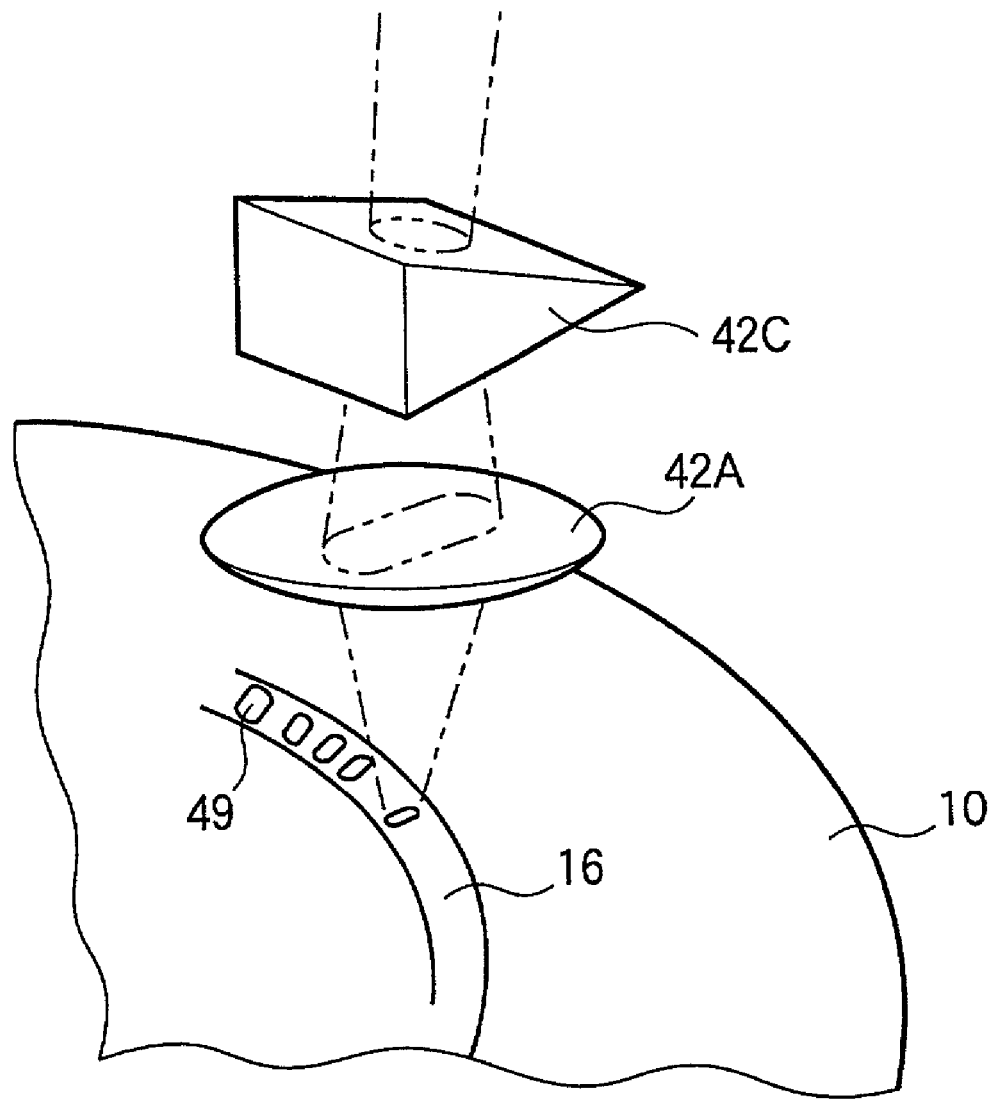
FIG. 12 is a flowchart illustrating an optical recording method according to the present invention.

The laser beam is circular in shape at the position of the recording layer 12. However, as shown in FIG. 12, for example, the laser beam may be adapted, by adding a beam shaping prism 42C, an aperture (not shown) or the like to the objective lens 42A, so as to be shorter in shape in the feed direction of the recording medium 10 and longer, elliptical, or linear in the direction perpendicular thereto. In this case, a recording mark 49 reduced in length allows for making the virtual recording cell much shorter. That is, it is possible to improve the recording density.

The aforementioned embodiment employs a disc of CD-R as the optical recording medium 10, however, the present invention is not limited thereto but can be applied generally to other optical recording media.

In addition, in this embodiment, such a case has been explained in which the optical recording medium 10 has the recording layer 12 made of an organic dye material to function as a CD-R. However, it is also acceptable to use an optical recording medium of a CD-RW type which employs a phase changing recording layer as the recording layer or other optical recording media other than those of a CD-RW type.

Incidentally, in this embodiment, such a case has been shown in which all recording marks are less than or equal to the diameter D of the converged beam, however, the present invention is not limited thereto but includes such a case where only part of the recording marks are less than or equal to the diameter D. In the aforementioned optical recording apparatus 30, such a case has also been shown in which the laser driver 38 is used to set the irradiation time of a laser beam. However, the irradiation power may be modulated to form recording marks of different sizes. After all, the present invention can be successfully implemented only if the irradiation of a laser beam can be controlled. For example, a shutter that can modulate the transmission of the beam light may be used to control the irradiation time or irradiation power of the laser beam.

In addition, in this embodiment, as shown in FIG. 5, data can be still read well even from recording marks (all the recording marks 48A to 48G here) formed to be less than or equal in length or width to the diameter D of the converged beam of the laser for reading operations. Accordingly, it is possible to dramatically increase the recording density per unit area in comparison with the prior art.

In addition, in the aforementioned embodiment, the recording layer 12 is made of an organic dye such as cyanine or a phase changing material. However, the present invention is not limited thereto but may use any organic dye other than those mentioned above, an inorganic material, or other materials as appropriate as long as the materials allow for forming recording marks of different sizes in five stages or more in response to the irradiation time of a laser beam (those materials are well used which have characteristics that satisfy the dynamic range of the aforementioned reflectivity and/or variations in reflectivity). Incidentally, when such an organic dye as mentioned above was used, it was possible to perform recording by positively changing the size of recording marks in response to the irradiation times of a laser beam in five stages or more and read the respective recording marks with very high accuracy.

Furthermore, the unit width B of the virtual recording cells 40, which is set on the recording layer 12 upon forming recording marks by means of the optical recording apparatus 30, is not limited to those of the embodiment. Here, such a case has been shown in which the unit width B of the virtual recording cell 40 is generally equal to (slightly greater than) the groove width W. However, for example, the aforementioned unit width B may be less than or equal to the width W of the groove 16 if the beam waist of a laser beam can be further reduced in diameter. On the other hand, suppose that recording marks are recorded in more multi-stages such as eight stages. In this case, the size of the virtual recording cell 40 may be set to be greater than or equal to the laser beam waist. In this case, some part of recording marks can be made greater than or equal in size to the beam waist.

Furthermore, the aforementioned embodiment is related to the optical recording medium 10 which includes non-recorded regions where no information such as data is not recorded. However, the present invention is not limited thereto but may be applied to read-only optical recording media on which information is multi-level recorded in five stages or more. The present invention can also be applied to an optical recording medium having no grooves 16.

Furthermore, as shown by reference numeral 52 in FIG. 1, the optical recording medium 10 may be adapted to have a plurality of pits different in reflectivity and equal in number to the stages of signal modulation. Alternatively, the multi-level recording according to the optical recording method of the present invention may be performed in advance on part of the optical recording medium such as on the read-in area. On the signal prerecording portion (described later) such as the plurality of pits 52 and/or recording marks 54 on multi-level recorded portions, it is possible to provide identifying information such as information for identifying individual recording media, information for identifying the medium as an optical recording medium for multi-level recording, information for determining the power (and/or the irradiation time) of a laser beam used for recording or reading the recording medium, information on the number of stages for modulating the irradiation time or irradiation power of the laser, and information on the rotational angular velocity of the virtual recording cell 40 being constant on whole or part thereof (CAV or ZCAV). By reading the identifying information upon reading and/or recording the optical recording medium, it is possible to positively identify that the medium is an optical recording medium for multi-level recording, identify individual recording media, and determine the number of stages of laser beam power in response to the number of stages of pits that have been recorded in advance. This allows for performing multi-level recording and reading operations more positively.

Normally, a recording medium for a CD-RW and a DVD-R/RW records a signal by wobbling a recording groove. This signal is referred to as an address signal. To read this signal enables a recording device to move a recording head to a predetermined position.

For example, in the case of a CD-R/RW, a time code of a minute and a second, whereby a position is replaced with a time, is recorded in this address signal. The recording device reads this time code and moves the head to a read-in portion, so that the recording device becomes possible to read various data.

A multi-level optical recording medium according to the present invention is capable of adopting an address signal by wobbling in the case that this multi-level optical recording medium is used (i.e., recorded or reproduced) in a recording device to be applied to a CD-R/RW. However, in this case, a signal system such as an address code or the like, which is different from a normal time code of a CD-R/RW, is adopted. A normal recording device is not capable of reading a peculiar address signal, which is different from that of the CD-R/RW, and is not capable of moving a head to a predetermined position (in this case, the multi-level optical recording medium is discharged from the recording device).

On the other hand, a recording device in association with multi-level recording becomes possible to read a signal by moving the head to the read-in portion, if the peculiar address is set to be capable of being identified.

In other words, it is possible to distinguish a multi-level optical recording medium from other optical recording medium by adopting an address, which is different from a normal address.

Figure 14:
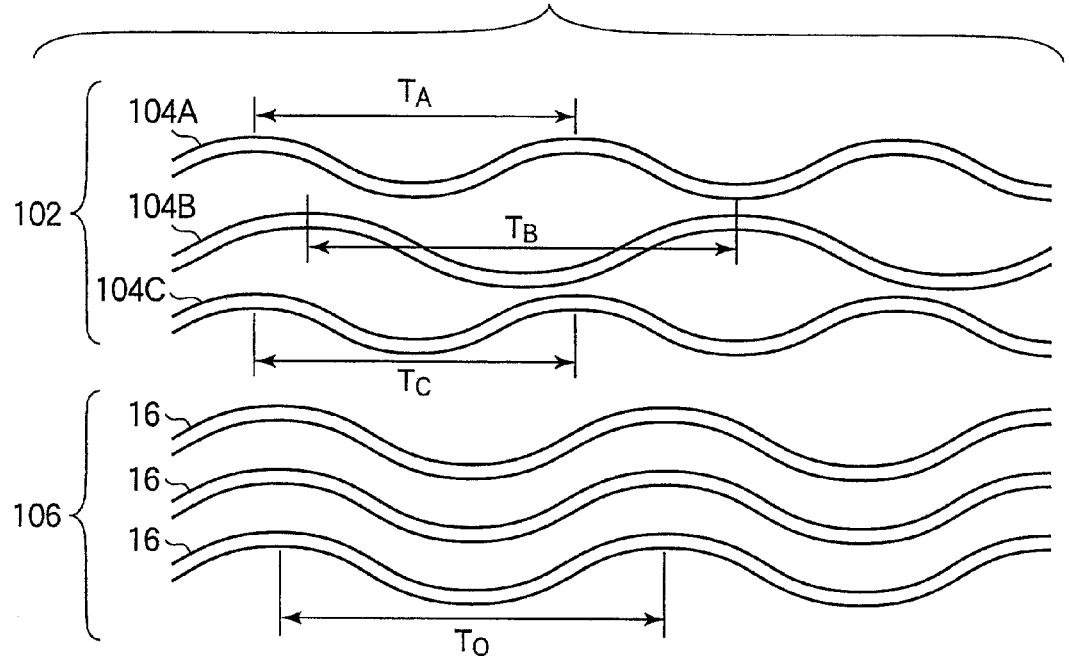
FIG. 14 is an enlarged schematic view illustrating the wobble on which various information are recorded on the optical recording medium of the present invention.

For example, as shown in FIG. 14, the recording by the use of the above described wobble is performed by modulating the wobble in grooves 104A to 104C in a read-in area 102 of an optical recording medium 10.

Figure 15:
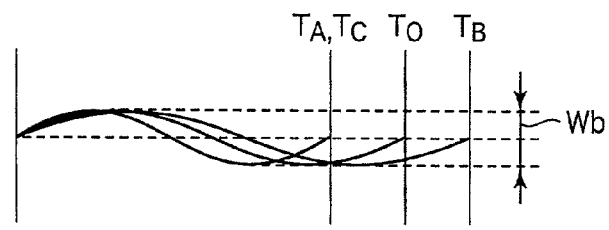
FIG. 15 is a diagram illustrating the relationship between wobble frequencies of the wobble and binary information.

Specifically, as shown in FIG. 15, without changing amplitude Wb of the wobble, wobble frequencies $T_A$, $T_B$ and $T_C$ of respective grooves are changed. For example, a wobble frequency $T_o$ of a groove 16 in a user area 106 shown in FIG. 10 is defined as a reference frequency and a wobble frequency $T_B$, which is longer than this reference frequency $T_0$, is mounted on a two-level signal indicating "1" and wobble frequencies $T_A$ and $T_C$, which are shorter than the reference frequency $T_0$, are mounted on a two-level signal indicating "0", so that the above described various information are recorded. Accordingly, for example, when the wobble frequencies are defined as "0", "1" and "0" counted from the inner periphery of the optical recording medium, it is indicated that this optical recording medium 10 is set to be used for the multi-level recording.

Alternatively, the above described predetermined information is defined as recording start position information and then, on the basis of this information, the recording of the information is set to be started from a predetermined position of the user area 106. This information also becomes the information of a starting position of a virtual recording cell 40.

Figure 16:
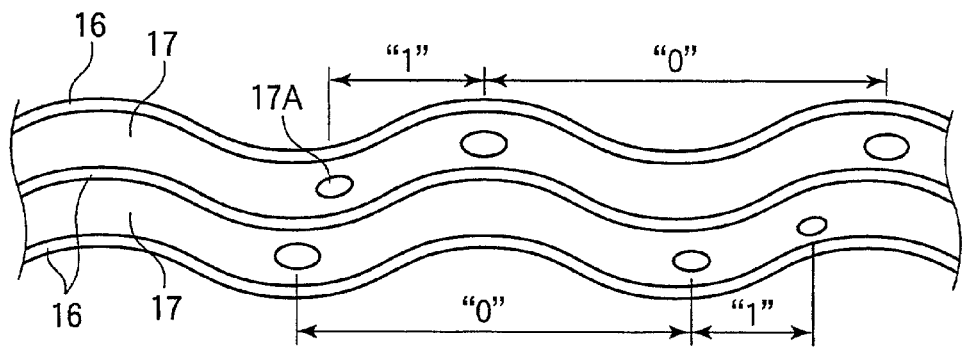
FIG. 16 is a schematic view illustrating the relationship between a binary information and a land pre-pit on which various information are recorded on the optical recording medium of the present invention.

Alternatively, according to other example of a recording method of the above described various information as shown in FIG. 16, the above described various information are mounted on a land pre-pit 17A, which has been formed in a land 17 between respective grooves 16, and then, for example, in the case that a frequency between the land pre-pits is short, the optical recording medium 10 binary records the information as "1" and in the case that a frequency between the land pre-pits is long, the optical recording medium 10 binary records the information as "0". However, in the present invention, it is preferable not to use the land pre-pit if lands are used as a recording region.

Figure 17:
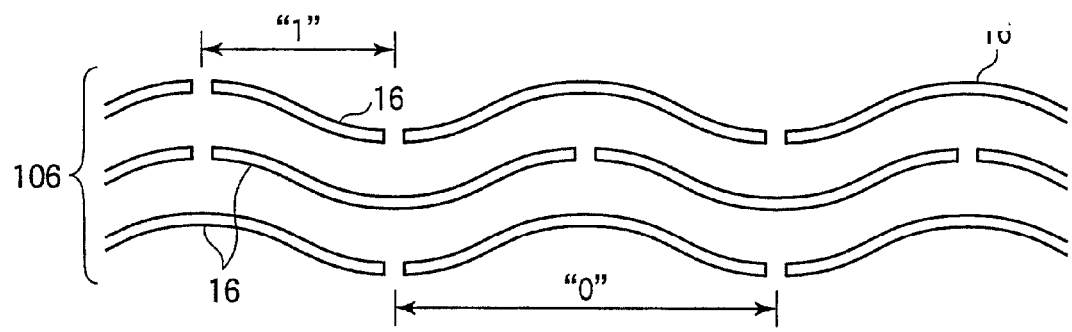
FIG. 17 is a schematic view illustrating the relationship between a binary information and a ceased length of the groove on which various information are recorded on the optical recording medium of the present invention.

Further, according to other example as shown in FIG. 17, the grooves 16 are ceased and then, for example, in the case that a ceased length of the groove is short, the optical recording medium 10 is controlled to indicate "1" and for example, in the case that it is long, the optical recording medium 10 is controlled to indicate "0".

By enabling the information recorded by the information recording means shown in the above described FIGS. 14, 16 and 17 also to be capable of being read by even a reading device of a conventional binary recording type, even if this multi-level optical recording medium is loaded in a reading and/or recording device of a binary recording type by mistake, this multi-level optical recording medium is easily identified as a multi-level type recording medium.

Figure 18:
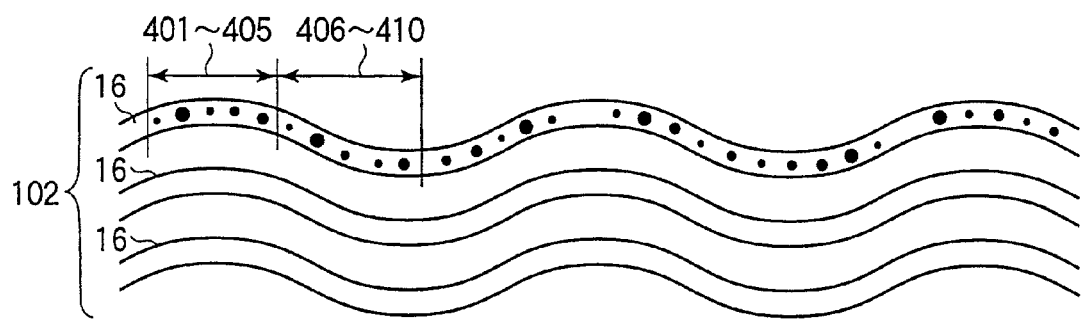
FIG. 18 is a schematic view illustrating the virtual recording cells and the recording marks on which various information are recorded on the optical recording medium of the present invention.

Further, for example, as shown in FIG. 18, it is possible to multi-level record the above described various information in the read-in area 102 in advance. In this case, in FIG. 18, it is possible to record the fact that this recording medium is a multi-level recording medium and the number of the stages of the multi-level recording by means of first five recording marks of virtual recording cells 401 to 405 and it is possible to record a recommended laser power for recording or reading or the like by means of next five virtual recording cells 406 to 410, respectively.

As the signal prerecording portion, the grove wobble portion 56A, the land pre-pit 56B, and a sample servo are used solely or in combination.

The sample servo is the recording mark 54 of a multi-level recorded portion which has in advance a plurality of pits different in reflectivity and equal in number to the stages of signal modulation or on which multi-level recording has been performed in advance in part of the optical recording medium as described above.

In the aforementioned embodiment, a high-density multi-level recording is achieved by (1) rotating the virtual recording cells at a constant angular velocity, (2) specifying the unit length H of the virtual recording cell, (3) controlling the angle of the irradiated beam of a laser beam, (4) running OPC upon irradiation with a laser beam, or in combination between them and (5) recording the groove and land. However, the present invention is not limited to the combination of them but provides a sufficient effect by combining one or more of the (1) to (5).

The optical recording method and the optical recording medium according to the present invention make it possible to perform multi-level recording in response to the data to be recorded and provide good characteristics to read signals from the recording marks.

EXAMPLES

Now, the present invention is explained in conjunction with a comparative example with reference to examples in which the optical recording medium 10 according to the present invention has a constant angular velocity on the virtual recording cell 40.

A CD-R was used here as the optical recording medium 10 which had the recording layer 12 made of a dye, and irradiation time was modulated to carry out a multi-level recording experiment in six stages (six and eight stages in Example 5) at radial positions of 25 mm and 50 mm.

The implementation conditions and results of Examples 1 to 7 and the comparative example were as shown in Table 1, and a high transfer rate and the reduction in access time were confirmed. Incidentally, the recording linear velocities in Examples 1 to 7 were 10.5 m/sec at a radius of 25 mm and 21.0 m/s at a radius of 50 mm at a constant angular velocity.

TABLE 1

| Example | Rotational velocity (rpm) | Laser recording power (mW) | Cell length (μm) At 25 mm | At 50 mm | Jitter value (%) At 25 mm | At 50 mm |
|---|---|---|---|---|---|---|
| 1 | 4000 | 15 | 1 | 2 | 7 | 9 |
| 2 | 4000 | 15 | 1 | — | 7 | — |
|   |      | 18 | — | 2 | — | 6 |
| 3 | 3000 | 13 | 1 | 2 | 7 | 8 |
| 4 | 4000 | 15 | 0.6 | 1.2 | 8 | 9 |
| 5 | 4000 | 17 | 1 | 2 | 8 | 8 |
|   |      |    |   |   | (6 stages) | (8 stages) |
| 6 | 4000 | 15 | 1 | 2 | 7 | 9 |
|   |      |    | Concentric groove |  |  |  |
| 7 | 4000 | 15 | 1 | 2 | 6 | 7 |
|   | Recording start position was shifted in adjacent virtual recording cells. | | | | | |
| Comparative example | Linear velocity 10.5 m/sec | 15 | 1 | 1 | 7 | 7 |
| Transfer rate on the disk outer circumference Example/Comparative example = 2 | | | | | | |

It was made possible to perform multi-level recording in five stages or more in the direction of variation in reflectivity along the depth of a recording layer. This was accomplished according to the recording method for performing multi-level recording of data to be recorded by irradiating a disc-shaped optical recording medium having the recording layer with a laser beam with its irradiation time or irradiation power being changed in five stages or more, while the optical recording medium is being rotated at a constant angular velocity at the position to be irradiated with the laser beam. This has facilitated the rotational control of the drive, and achieved a high transfer rate and a reduction in access time in comparison with the case of rotating the optical recording medium at the constant linear velocity.

Now, an example of using the running OPC of the present invention is shown below in conjunction with a comparative example. This example and the comparative example have the following specific conditions.

Figure 13:
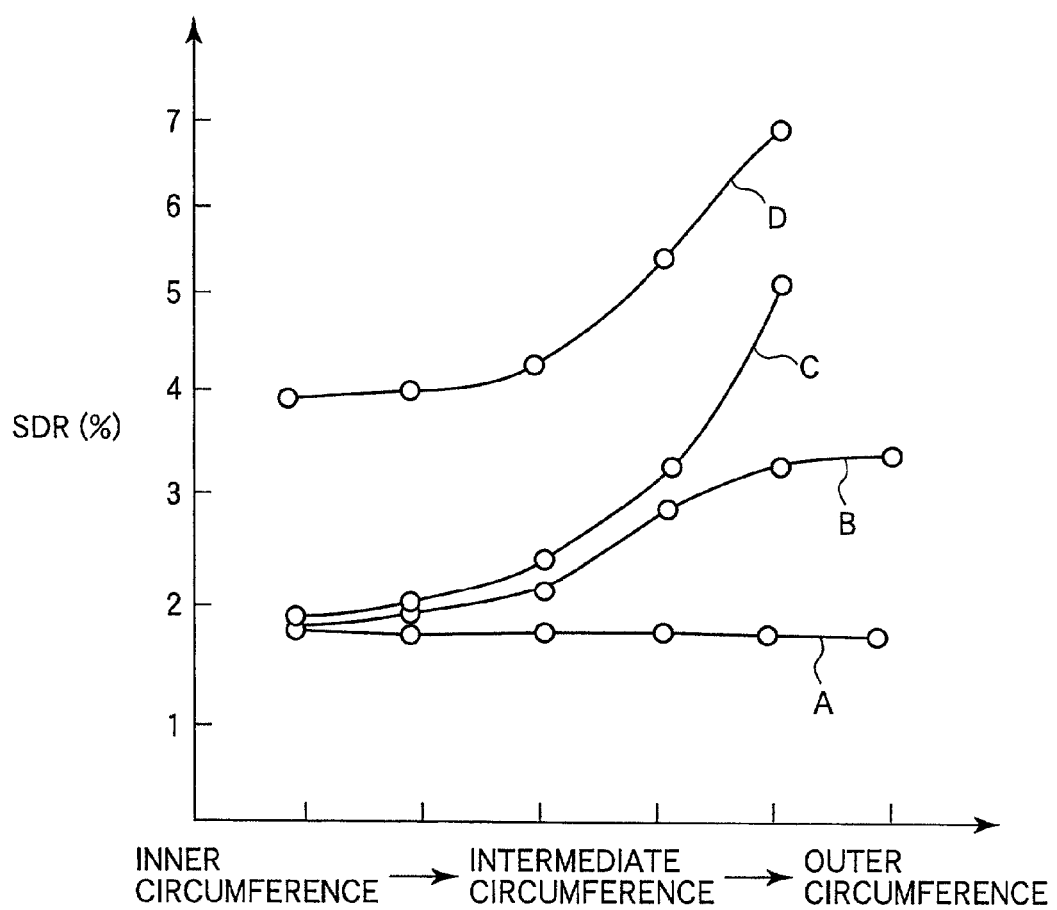
FIG. 13 is a diagram illustrating the measurement results in comparison of an example of the present invention with a comparative example.

An experiment of multi-level recording was carried out using a CD-R as the recording medium 10 which had a recording layer made of a dye, with the results of SDRs being determined as shown in FIG. 13. Measured points were in the range from the inner through intermediate to outer circumference of the disc at radii of 20 mm to 60 mm.

What is meant here by SDR is a variation of signal at each stage which is determined from the reflectivity and the dynamic range of each of multi-level stages. It is needless to say that signals can be recorded or read well if the variation (the standard deviation σ of reflectivity that is normalized with the dynamic range) is small. According to experiments carried out by the inventor et al, the value of SDRs is preferably 5% or less, more preferably 3% or less. Here, a value of 2% or less was targeted.

A general-purpose drive for a CD-R/RW was modified for use as the reading and recording apparatus, and a reflectivity was measured using a digital oscilloscope made by Hewlett Packard to determine the dynamic range.

As can be seen from FIG. 5, the OPC is employed to determine the optimum power at the start of recording and thus the SDR would otherwise have a bad value. With no running OPC, the SDR has a worse value (see "D" in FIG. 13).

With OPC but without running OPC, the optimum power would be shifted either toward a larger side or smaller side. When the optimum power is shifted toward the larger side (see "B" in FIG. 13), the recording advances more than expected. This causes the SDR to become worse or the recording layer to be burned off from a certain point of SDR, resulting in no more apparent degradation in SDR.

On the contrary, when the optimum power is shifted toward the smaller side (see "C" in FIG. 13), the SDR continues to worsen since the state in which recording does not proceed to its end continues to worsen.

As shown by "A" in FIG. 13, the multi-level recording with OPC and running OPC according to the present invention provided a good value of SDR less than or equal to 2%.

According to the optical recording method of the present invention, upon performing additional multi-level recording in five stages or more, it is possible to distinguishably perform the recording of each stage even with variations present in the state of the recording layer, thus allowing for performing multi-level recording in more multi-stages.

Now, the present invention is explained with reference to an example of performing the land-groove recording of the present invention, in conjunction with a comparative example.

Here, used as the optical recording medium 10 were a CD-RW which had the recording layer 12 made of a phase changing material and a CD-R which had the recording layer 12 made of a dye, and irradiation time was modulated to carry out a multi-level recording experiment in eight stages.

The results of the experiment are shown in Table 2. What is meant here by SDR is a variation of signal at each stage which is determined from the reflectivity and the dynamic range of each of multi-level stages. The L/G indicates land-groove recording and G indicates groove only recording, respectively. According to the experiment carried out by the inventor, the value of SDRs is preferably 2% or less, thereby making it possible to provide good read signals. Here, a value of 30% or less was targeted as the stroke.

It was made possible to perform multi-level recording in five stages or more in the direction of variation in reflectivity along the depth of a recording layer. This was accomplished according to the recording method for performing multi-level recording of data to be recorded on both grooves and lands by irradiating a disc-shaped optical recording medium having the recording layer on the grooves and lands with a laser beam with its irradiation time or irradiation power being changed in five stages or more.

What is claimed is:

1. A disc-shaped optical recording medium for recording information thereon by being irradiated with a laser beam to form recording marks on a recording layer while being rotated about the center of the disc, the optical recording medium being capable of reading the recorded information by irradiating the recording mark with a reading laser beam, wherein a plurality of virtual recording cells are set on the recording layer continuously in a concentric fashion or in a spiral fashion about the center of the disc, the virtual recording cell being defined by a unit length in a rotational direction of the disc and a unit width perpendicular thereto; the unit length of at least part of the virtual recording cell is set so as to have an arc length of the same center angle with respect to the center of the disc irrespective of positions in a radial direction of the disc; the recording layer of the virtual recording cell allows for forming thereon recording marks of different sizes in response to the laser beam with at least one of irradiation time and irradiation power of the laser beam being modulated in five stages or more; and thereby information can be recorded in multi-levels in five stages or more by modulating an optical reflectivity in accordance with at least an area ratio of the recording mark to the virtual recording cell between the area ratio and optical transmittance.

2. The optical recording medium according to claim 1, wherein the unit length of the virtual recording cell is increased toward the outer circumference of the disc, and thereby stages of modulation on at least one of the irradiation time and the irradiation power of the laser beam to be directed at the virtual recording cell is increased in number toward the outer circumference of the disc.

3. The optical recording medium according to claim 1, wherein within a range of the arc length being twice or more an arc length on the innermost side in the radial direction of the disc, two virtual recording cells are set within the range of the arc length.

4. The optical recording medium according to claim 2, wherein

TABLE 2

| | Recording film | ML number of stages | Cell length | Recording linear velocity | Recording portion | Track pitch | Groove width | Land width | SDR | Cross talk |
|---|---|---|---|---|---|---|---|---|---|---|
| Example 1 | Phase changing | 8 | 600 | 9.6 | L/G | 2000 | 1000 | 1000 | 1.8 | 20 |
| Comparative example 1 | Phase changing | 8 | 600 | 9.6 | G | 1000 | 500 | 500 | 4.2 | 40 |
| Example 2 | Dye | 8 | 600 | 9.6 | L/G | 2000 | 1000 | 1000 | 1.5 | 22 |
| Comparative example 2 | Dye | 8 | 600 | 9.6 | G | 1000 | 400 | 600 | 3.7 | 45 | along the recording layer, a groove for guiding a laser beam is sandwiched by lands disposed in parallel thereto, and provided in a concentric fashion with a constant pitch or in a spiral fashion in the radial direction of the disc; the virtual recording cell is set in the groove with the unit width being generally made equal to the width of the groove; and at least one of information on the number of stages of modulation and information on divided virtual recording cell is prerecorded at least on part of a signal prerecording portion including a grove wobble, land pre-pit, and sample servo.

5. The optical recording medium according to claim 1, wherein
information on recording rotation maintained at a constant angular velocity on part of virtual recording cells by keeping an angular velocity constant on each virtual recording cell or by partially changing the number of rotations is prerecorded at least on part of a signal prerecording portion including a grove wobble, land pre-pit, and sample servo.

6. The optical recording medium according to claim 1, wherein
the unit length of the virtual recording cell on an innermost side in the radial direction of the disc is less than or equal to a diameter of a beam waist of the recording laser beam.

7. An optical recording medium capable of forming recording marks to record information thereon by irradiating a recording layer formed on an optical transparent substrate with a laser beam, wherein
on a recording mark formation region, a plurality of virtual recording cells are contiguously defined in a direction of movement relative to the laser beam, the virtual recording cell having a predetermined unit length and a predetermined unit width perpendicular thereto; an amount of reflected light from a virtual recording cell, having a recording mark formed thereon and irradiated with a laser beam, is modulated in five stages or more in response to the size of the recording mark, a recording strength of the laser beam being switched in five stages or more, the recording strength being at least one of irradiation time and irradiation power of the laser beam; and the optical recording medium has information referenced to correct the recording strength of the laser beam to be used for recording, upon recording by switching the recording strength of the laser beam in five stages or more.

8. A disc-shaped optical recording medium capable of recording information thereon by irradiating a recording layer with a laser beam to form recording marks on the recording layer and capable of reading the recorded information by irradiating the recording marks with a reading laser beam, while the optical recording medium is being rotated, the optical recording medium having a groove, for guiding the laser beam, sandwiched by lands disposed in parallel thereto and in a concentric fashion or in a spiral fashion at a constant pitch in the radial direction of the disc, the optical recording medium wherein
the recording layer is formed on the groove and the lands; a plurality of virtual recording cells are set contiguously in a rotational direction of the disc, the virtual recording cell being defined by a unit length in the rotational direction of the disc and a unit width perpendicular thereto on the recording layer disposed on the groove and-lands; the recording layer of the virtual recording cell allows for forming thereon recording marks of different sizes in response to a laser beam with at least one of irradiation time and irradiation power of the laser beam being modulated in five stages or more; and thereby information can be recorded in multi-levels in five stages or more by modulating an optical reflectivity in accordance with at least an area ratio of the recording mark to the virtual recording cell among the area ratio and optical transmittance.

9. The optical recording medium according to claim 8, wherein
the unit length of the virtual recording cell is set to be generally equal to the length of a recording mark formed by being irradiated with a laser beam in the maximum irradiation time.

10. The optical recording medium according to claim 8, wherein
the unit width of the virtual recording cell that is set within the groove is set to be generally equal to the width of the groove.

11. The optical recording medium according to claim 8, wherein
the unit width of the virtual recording cell provided on the lands is set to be generally equal to the width of the land.

12. The optical recording medium according to claim 8, wherein
the unit length of the virtual recording cell is less than or equal to the diameter of the beam waist of the reading laser beam.

13. The optical recording medium according to claim 9, wherein
at least one of information that recording can be performed on both the groove and lands, and information that the optical recording medium is a multi-level recording medium is prerecorded at least on part a signal prerecording portion including a groove wobble, land pre-pit, and sample servo.

14. A disc-shaped optical recording medium capable of recording information thereon by irradiating a recording layer with a laser beam to form recording marks on the recording layer and capable of reading the recorded information by irradiating the recording marks with a reading laser beam, while the optical recording medium is being rotated, the optical recording medium having a groove, for guiding the laser beam, sandwiched by lands disposed in parallel thereto and in a concentric fashion or in a spiral fashion at a constant pitch in the radial direction of the disc, the optical recording medium wherein
the recording layer is formed on the groove and the lands; a plurality of virtual recording cells are set contiguously in a rotational direction of the disc, the virtual recording cell being defined by a unit length in the rotational direction of the disc and a unit width perpendicular thereto on the recording layer disposed on the groove and-lands; the recording layer of the virtual recording cell allows for forming thereon recording marks of different sizes in response to a laser beam with at least one of irradiation time and irradiation power of the laser beam being modulated in five stages or more; thereby information can be recorded in multi-levels in five stages or more by modulating an optical reflectivity in accordance with at least an area ratio of the recording mark to the virtual recording cell among the area ratio and optical transmittance; and on a recording mark formation region, the optical recording medium has information referenced to correct the recording strength of the laser beam to be used for recording, upon recording by switching the recording strength of the laser beam in five stages or more.

15. An optical recording method for recording information on a disc-shaped optical recording medium having a recording layer, while the optical recording medium is being rotated, by irradiating the recording layer with a laser beam to thereby form recording marks on the recording layer, wherein
a plurality of virtual recording cells are assumed contiguously on the recording layer in a concentric fashion or in a spiral fashion about the center of the disc; a unit length of at least part of the virtual recording cell is set so as to have an arc length of the same center angle with respect to the center of the disc irrespective of positions in a radial direction of the disc; with rotation upon recording at least part of the virtual recording cell being kept at a constant angular velocity, at least one of irradiation time and irradiation power of the laser beam is modulated for each virtual recording cell in five stages or more to change the size of a recording mark formed in the virtual recording cell; and an optical reflectivity of the entire virtual recording cell is modulated in accordance with at least an area ratio of the recording mark to the virtual recording cell among the area ratio and optical transmittance of the recording mark, thereby recording information in multi-levels in five stages or more.

16. The optical recording method according to claim 15, wherein
stages of modulation on at least one of the irradiation time and the irradiation power of the laser beam to be directed at the virtual recording cell is increased in number toward the outer circumference of the disc.

17. The optical recording method according to claim 15, wherein
the irradiation power of the laser beam is varied in response to the position of irradiation in the radial direction of the disc.

18. The optical recording method according to claim 17, wherein
the irradiation power is sequentially increased from an inner position of irradiation in the radial direction of the disc toward an outer position of irradiation.

19. The optical recording method according to claim 15, wherein
a starting position of recording within the virtual recording cell is assigned as appropriate to any one of a leading end, the center, and a trailing end in response to the position in the radial direction of the disc.

20. The optical recording method according to claim 15, wherein
the virtual recording cell is contiguously assumed in a concentric fashion about the center of the disc, and starting positions of virtual recording cells adjacent to each other in the radial direction of the disc are set to be shifted from each other in the rotational direction of the disc.

21. An optical recording method for recording information on a disc-shaped optical recording medium with a groove and lands having a recording layer formed thereon, while the optical recording medium is being rotated, by irradiating the recording layer with a laser beam to form recording marks on the recording layer, the optical recording medium having the groove, for guiding the laser beam, sandwiched by the lands disposed in parallel thereto and in a concentric fashion or in a spiral fashion at a constant pitch in a radial direction of the disc, the method wherein
a plurality of virtual recording cells are assumed contiguously on the recording layer disposed on the groove and land in a rotational direction of the disc, the virtual recording cell being defined by a unit length in the rotational direction of the disc and a unit width perpendicular thereto; at least one of irradiation time and irradiation power of the laser beam is modulated for each virtual recording cell in five stages or more to change the size of a recording mark formed in the virtual recording cell; and an optical reflectivity of the entire virtual recording cell is modulated in accordance with at least an area ratio of the recording mark to the virtual recording cell among the area ratio and optical transmittance of the recording mark, thereby recording information in multi-levels in five stages or more.

22. An optical recording method for recording information on an optical recording medium capable of forming recording marks thereon by irradiating a recording layer formed on an optical transparent substrate with a laser beam, wherein
on a recording mark formation region of the optical recording medium, a plurality of virtual recording cells are contiguously defined in a direction of movement relative to the laser beam, the virtual recording cell having a predetermined unit length and a predetermined unit width perpendicular thereto; an amount of reflected light from a virtual recording cell, having a recording mark formed thereon and irradiated with a laser beam, is modulated in five stages or more in response to the size of the recording mark; and
upon irradiating the virtual recording cell with a laser beam with a recording strength of the laser beam being switched in five stages or more, the recording strength being at least one of irradiation time and irradiation power of the laser beam, while at least the amount of reflected light in one stage obtained by the optical recording medium is being confirmed and a recording strength associated at least with the amount of reflected light in the stage is being corrected, multi-level recording is performed.

23. The optical recording method according to claim 22, wherein
the confirmed amount of reflected light is compared with prerecorded information on a recording strength of a laser beam upon recording.

24. The optical recording method according to claim 22, wherein
the prerecorded information on a recording strength of a laser beam upon recording is recorded on a wobble or a land pre-pit.

25. The optical recording method according to claim 22, wherein
at least the amount of reflected light in the stage is confirmed and the amounts of reflected light in stages before and after the sage are confirmed as well.

26. The optical recording method according to claim 22, wherein
the amount of reflected light is confirmed using a virtual recording cell of a predetermined portion of the recording medium.

27. The optical recording method according to claim 22, wherein
the recording strength of the laser beam upon recording is kept constant from the point of time at which the recording strength of the laser beam upon recording is corrected until an amount of reflected light to be confirmed is shifted by a predetermined amount.

28. The optical recording method according to claim 22, wherein
the prerecorded information on a recording strength of a laser beam upon recording is recorded on a read-in area, a wobble, or a land pre-pit.

29. An optical recording method for recording information on an optical recording medium capable of forming recording marks thereon by irradiating a recording layer formed on an optical transparent substrate with a laser beam, wherein
on a recording mark formation region of the optical recording medium, a plurality of virtual recording cells are contiguously defined in a direction of movement relative to the laser beam, the virtual recording cell having a predetermined unit length and a predetermined unit width perpendicular thereto; before the virtual recording cell is irradiated with a laser beam with a recording strength of the laser beam being switched in five stages or more, the recording strength being at least one of irradiation time and irradiation power of the laser beam, part of the virtual recording cell is irradiated with the laser beam at least at a recording strength of those in the stages to form recording marks; and thereby multi-level recording is performed while the recording strength of the laser beam is being corrected by comparing the amount of reflected light obtained from the virtual recording cell with the amount of reflected light on a recording mark of a predetermined reference virtual recording cell.

30. The optical recording method according to claim 29, wherein
at least the amount of reflected light in the stage is confirmed and the difference between this amount of reflected light and the amounts of reflected light in stages before and after the sage is confirmed as well, thereby correcting the recording strength of the laser beam.

31. An optical recording method for recording information on a disc-shaped optical recording medium with a groove and lands having a recording layer formed thereon, while the optical recording medium is being rotated, by irradiating the recording layer with a laser beam to form recording marks on the recording layer, the optical recording medium having the groove, for guiding the laser beam, sandwiched by the lands disposed in parallel thereto and in a concentric fashion or in a spiral fashion at a constant pitch in a radial direction of the disc, the method wherein
a plurality of virtual recording cells are assumed contiguously on the recording layer disposed on the groove and land in a rotational direction of the disc, the virtual recording cell being defined by a unit length in the rotational direction of the disc and a unit width perpendicular thereto; at least one of irradiation time and irradiation power of the laser beam is modulated for each virtual recording cell in five stages or more to change the size of a recording mark formed in the virtual recording cell; while at least the amount of reflected light in one stage obtained by the optical recording medium is being confirmed and a recording strength associated at least with the amount of reflected light in the stage is being corrected; and an optical reflectivity of the entire virtual recording cell is modulated in accordance with at least an area ratio of the recording mark to the virtual recording cell among the area ratio and optical transmittance of the recording mark, thereby recording information in multi-levels in five stages or more.

32. An optical recording method for recording information on a disc-shaped optical recording medium with a groove and lands having a recording layer formed thereon, while the optical recording medium is being rotated, by irradiating the recording layer with a laser beam to form recording marks on the recording layer, the optical recording medium having the groove, for guiding the laser beam, sandwiched by the lands disposed in parallel thereto and in a concentric fashion or in a spiral fashion at a constant pitch in a radial direction of the disc, the method wherein
a plurality of virtual recording cells are assumed contiguously on the recording layer disposed on the groove and land in a rotational direction of the disc, the virtual recording cell being defined by a unit length in the rotational direction of the disc and a unit width perpendicular thereto; at least one of irradiation time and irradiation power of the laser beam is modulated for each virtual recording cell in five stages or more to change the size of a recording mark formed in the virtual recording cell; before the virtual recording cell is irradiated with a laser beam with a recording strength of the laser beam being switched in five stages or more, the recording strength being at least one of irradiation time and irradiation power of the laser beam, part of the virtual recording cell is irradiated with the laser beam at least at a recording strength of those in the stages to form recording marks; the irradiation of the laser beam is performed while the recording strength of the laser beam is being corrected by comparing the amount of reflected light obtained from the virtual recording cell with the amount of reflected light on a recording mark of a predetermined reference virtual recording cell, and an optical reflectivity of the entire virtual recording cell is modulated in accordance with at least an area ratio of the recording mark to the virtual recording cell among the area ratio and optical transmittance of the recording mark, thereby recording information in multi-levels in five stages or more.

* * * * *